(12) United States Patent
Park et al.

(10) Patent No.: US 8,717,519 B2
(45) Date of Patent: May 6, 2014

(54) OPTICAL FILM FOR REDUCING COLOR SHIFT AND LIQUID CRYSTAL DISPLAY HAVING THE SAME

(75) Inventors: Seong-Sik Park, ChungCheongNam-Do (KR); EunYoung Cho, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 75 days.

(21) Appl. No.: 13/348,997

(22) Filed: Jan. 12, 2012

(65) Prior Publication Data

US 2012/0182506 A1 Jul. 19, 2012

(30) Foreign Application Priority Data

Jan. 13, 2011 (KR) ........................ 10-2011-0003523

(51) Int. Cl.
*G02F 1/1335* (2006.01)
(52) U.S. Cl.
USPC .......................................... 349/106; 349/109
(58) Field of Classification Search
USPC .................................. 349/106, 109, 57, 112
See application file for complete search history.

(56) References Cited

U.S. PATENT DOCUMENTS

| | | | |
|---|---|---|---|
| 3,647,279 A * | 3/1972 | Sharpless et al. | ............... 349/23 |
| 5,600,456 A | 2/1997 | Maruyama et al. | |
| 6,339,459 B1 * | 1/2002 | Ichikawa et al. | ............... 349/95 |
| 2010/0073794 A1 | 3/2010 | Park et al. | |
| 2010/0245738 A1 | 9/2010 | Nishihara et al. | |

FOREIGN PATENT DOCUMENTS

| | | |
|---|---|---|
| JP | 2006184609 A | 7/2006 |
| KR | 1020080060732 | 7/2008 |
| KR | 1020090014734 | 2/2009 |
| KR | 1020100134318 | 12/2010 |
| WO | 2009052052 | 4/2009 |

* cited by examiner

*Primary Examiner* — Phu Vu
(74) *Attorney, Agent, or Firm* — Lerner, David, Littenberg, Krumholz & Mentlik, LLP

(57) ABSTRACT

An optical film for reducing color shift and an LCD having the same. The optical film is disposed in front of a display panel of the LCD. The optical film includes a background layer and a plurality of engraved or embossed lens sections formed in the background layer such that they are spaced apart from each other. When light having different colors depending on a viewing angle and a grayscale level is emitted, a portion of the light incident onto the lens sections is diffused, and is thus mixed with another portion of the light passing between adjacent lens sections. The cross-section of the lens sections includes first, second and third sides. The first and second sides face each other and are connected by the third side. The average curvature of the third side is smaller than that of the first side and than that of the second side.

15 Claims, 45 Drawing Sheets

OPTICAL FILM FOR REDUCING COLOR SHIFT AND LIQUID CRYSTAL DISPLAY HAVING THE SAME

CROSS REFERENCE TO RELATED APPLICATION

The present application claims priority from Korean Patent Application Number 10-2011-0003523 filed on Jan. 13, 2011, the entire contents of which application are incorporated herein for all purposes by this reference.

BACKGROUND OF THE INVENTION

1. Field of the Invention

The present invention relates to an optical film for reducing color shift and a liquid crystal display (LCD) having the same, and more particularly, to an optical film for reducing color shift and an LCD having the same, in which engraved or embossed lens sections are formed to reduce color shift depending on the viewing angle.

2. Description of Related Art

In response to the emergence of the advanced information society, components and devices related to image displays have been significantly improved and rapidly disseminated. Among them, image display devices have been widely distributed for use in TVs, personal computer (PC) monitors, and the like. Moreover, attempts are underway to simultaneously increase the size and reduce the thickness of such display devices.

In general, a liquid crystal display (LCD) is one type of flat panel display, and displays images using liquid crystals. The LCD is widely used throughout industry since it has the advantages of light weight, low drive voltage and low power consumption compared to other display devices.

FIG. 1 is a conceptual view schematically showing the basic structure and operating principle of an LCD 100.

With reference by way of example to a conventional vertical alignment (VA) LCD, two polarizer films 110 and 120 are arranged such that their optical axes are oriented perpendicular to each other. Liquid crystal molecules 150 having birefringence characteristics are interposed and arranged between two transparent substrates 130, which are coated with transparent electrodes 140. When an electric field is applied from a power supply unit 180, the liquid crystal molecules move and are aligned perpendicular to the electric field.

Light emitted from a backlight unit is linearly polarized after passing through the first polarizer film 120. As shown in the left of FIG. 1, the liquid crystal molecules remain perpendicular to the substrates when no power is applied. As a result, light that is in a linearly polarized state is blocked by the second polarizer film 110, the optical axis of which is perpendicular to that of the first polarizer film 120.

In the meantime, as shown in the right of FIG. 1, when power is on, the electric field causes the liquid crystal molecules to become horizontally aligned such that they are parallel to the substrates, between the two orthogonal polarizer films 110 and 120. Thus, the linearly polarized light from the first polarizer film is converted into another kind of linearly polarized light, the polarization of which is rotated by 90°, circularly polarized light, or elliptically polarized light while passing through the liquid crystal molecules before it reaches the second polarizer film. The converted light is then able to pass through the second polarizer film. It is possible to gradually change the orientation of the liquid crystal from the vertical orientation to the horizontal orientation by adjusting the intensity of the electric field, thereby allowing control of the intensity of light emission.

FIG. 2 is a conceptual view showing the orientation and optical transmissivity of liquid crystals depending on the viewing angle.

When liquid crystal molecules are aligned in a predetermined direction within a pixel 220, the orientation of the liquid crystal molecules varies depending on the viewing angle.

When viewed from the front left (210), the liquid crystal molecules look as if they are substantially aligned along the horizontal orientation 212, and the screen is relatively bright. When viewed from the front along the line 230, the liquid crystal molecules are seen to be aligned along the orientation 232, which is the same as the orientation inside the pixel 220. In addition, when viewed from the front left (250), the liquid crystal molecules look as if they are substantially aligned along the vertical orientation 252, and the screen is somewhat darker.

Accordingly, the viewing angle of the LCD is greatly limited compared to other displays, which intrinsically emit light, since the intensity and color of light of the LCD varies depending on changes in the viewing angle. A large amount of research has been carried out with the aim of increasing the viewing angle.

FIG. 3 is a conceptual view showing a conventional attempt to reduce variation in the contrast ratio and color shift depending on the viewing angle.

Referring to FIG. 3, a pixel is divided into two pixel parts, that is, first and second pixel parts 320 and 340, in which the orientations of liquid crystals are symmetrical to each other. Either the liquid crystals oriented as shown in the first pixel part 320 or the liquid crystals oriented as shown in the second pixel part 340 can be seen, depending on the viewing direction of a viewer. The intensity of light reaching the viewer is the total intensity of light of the two pixel parts.

When viewed from the front left (310), liquid crystal molecules in the first pixel part 320 look as if they are aligned along the horizontal orientation 312, and liquid crystal molecules in the second pixel part 320 look as if they are aligned along the vertical orientation 314. Thus, the first pixel part 320 makes the screen look bright. Likewise, when viewed from the front right (350), the liquid crystal molecules in the first pixel part 320 look as if they are aligned along the vertical orientation 352, and the liquid crystal molecules in the second pixel part 340 look as if they are aligned along the horizontal orientation 354. Then, the second pixel part 340 can make the screen look bright. In addition, when viewed from the front, the liquid crystal molecules are seen to be aligned along the orientations 332 and 334, which are the same as the orientations inside the pixel parts 320 and 340. Accordingly, the brightness of the screen observed by the viewer remains the same or similar, and is symmetrical about the vertical center line of the screen, even when the viewing angle changes. This, as a result, makes it possible to reduce variation in the contrast ratio and color shift depending on the viewing angle.

FIG. 4 is a conceptual view showing another conventional approach for reducing variation in the contrast ratio and color shift depending on to the viewing angle.

Referring to FIG. 4, an optical film 420 having birefringence characteristics is added. The birefringence characteristics of the optical film 420 are the same as those of liquid crystal molecules inside a pixel 440 of an LCD panel, and are symmetrical with the orientation of the liquid crystal molecules. Due to the orientation of the liquid crystal molecules inside the pixel 440 and the birefringence characteristics of the optical film, the intensity of light reaching the viewer is the total intensity of light from the optical film 420 and the pixel 440.

Specifically, when viewed from the front left (410), the liquid crystal molecules inside the pixel 440 look as if they are aligned along the horizontal orientation 414, and the imaginary liquid crystals produced by the optical film 420 look as if they are aligned along the vertical orientation 412. The resultant intensity of light is the total intensity of light from the optical film 420 and the pixel 440. Likewise, when viewed from the front right (450), the liquid crystal molecules inside the pixel 440 look as if they are aligned along the vertical orientation 454 and the imaginary liquid crystals produced by the optical film 420 look as if they are aligned along the horizontal orientation 452. The resultant intensity of light is the total intensity of light from the optical film 420 and the pixel 440. In addition, when viewed from the front, the liquid crystal molecules are seen to be aligned along the orientations 434 and 432, which are the same as the orientation inside the pixel 440 and the double-refracted orientation of the optical film 420, respectively.

However, even if the approaches described above are applied, there remains the problem shown in FIG. 5. That is, color shift still occurs depending on the viewing angle, and the color changes when the viewing angle increases.

In addition, optical films and display devices of the related art, in particular, TN mode LCDs, have the problem of gamma-curve distortion and grayscale inversion.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an optical film for reducing color shift that can reduce color shift in response to an increase in the viewing angle and an LCD having the same.

Also provided are an optical film for reducing color shift that can prevent ghosting and hazing while reducing color shift and an LCD having the same.

Also provided are an optical film for reducing gamma-curve distortion and grayscale inversion and an LCD having the same.

The above and other aspects, features and advantages of certain exemplary embodiments of the invention will be more apparent to a person having ordinary skilled in the art from the following description.

In an aspect of the present invention, the optical film for reducing color shift in an LCD is disposed in front of a display panel of the LCD, and includes a background layer and a plurality of engraved or embossed lens sections, the lens sections being formed in the background layer such that the lens sections are spaced apart from each other. When light having different colors depending on a viewing angle and a grayscale level because of birefringence characteristics of liquid crystal molecules is emitted from the LCD, the lens sections diffuse the direction in which a portion of the light incident onto the lens sections is emitted, so that the portion of the light is mixed with another portion of the light passing between adjacent ones of the lens sections. The respective cross-sectional profile of the lens sections includes first, second and third sides, the first and second sides facing each other, the third side connecting the first and second sides to each other, and an average curvature of the third side being smaller than that of the first side and than that of the second side.

In an exemplary embodiment, the average tangential inclination of the third side may be close to 0 in relation to those of the first and second sides.

In an exemplary embodiment, each of the first and second sides may include an arc of an ellipse.

In an exemplary embodiment, the third side may include a straight line.

According to exemplary embodiments of the invention, it is possible to increase the viewing angle and improve the image quality of a display device by reducing color shift in response to an increase in the viewing angle.

In addition, according to exemplary embodiments of the invention, it is possible to prevent ghosting and hazing while reducing color shift.

Furthermore, according to exemplary embodiments of the invention, it is possible to reduce gamma-curve distortion and grayscale inversion.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention, examples of which are illustrated in the accompanying drawings and described below. While the invention will be described in conjunction with exemplary embodiments thereof, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Comparative Examples

A description will be given below of comparative examples. The principle of reducing color shift of the present invention is described first, and then the mechanism of preventing ghosting and hazing using engraved lens sections is described.

Figure 6:
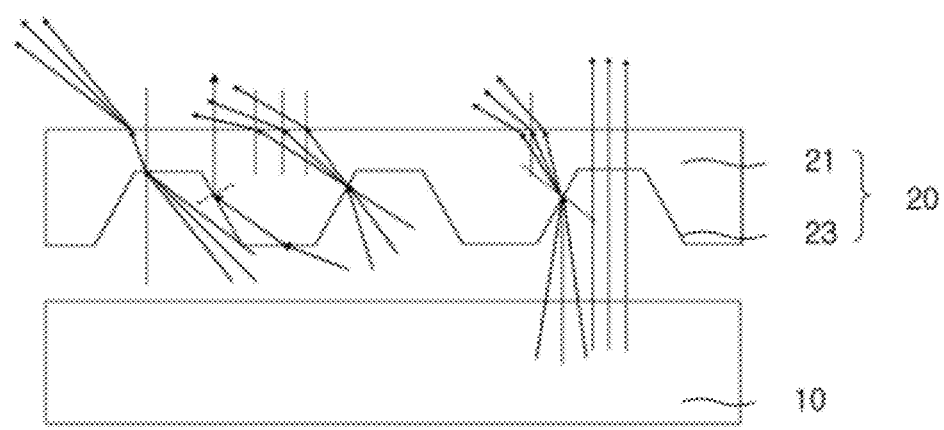
FIG. 6 to FIG. 13 are cross-sectional views showing lens sections according to comparative examples.
Figure 7:
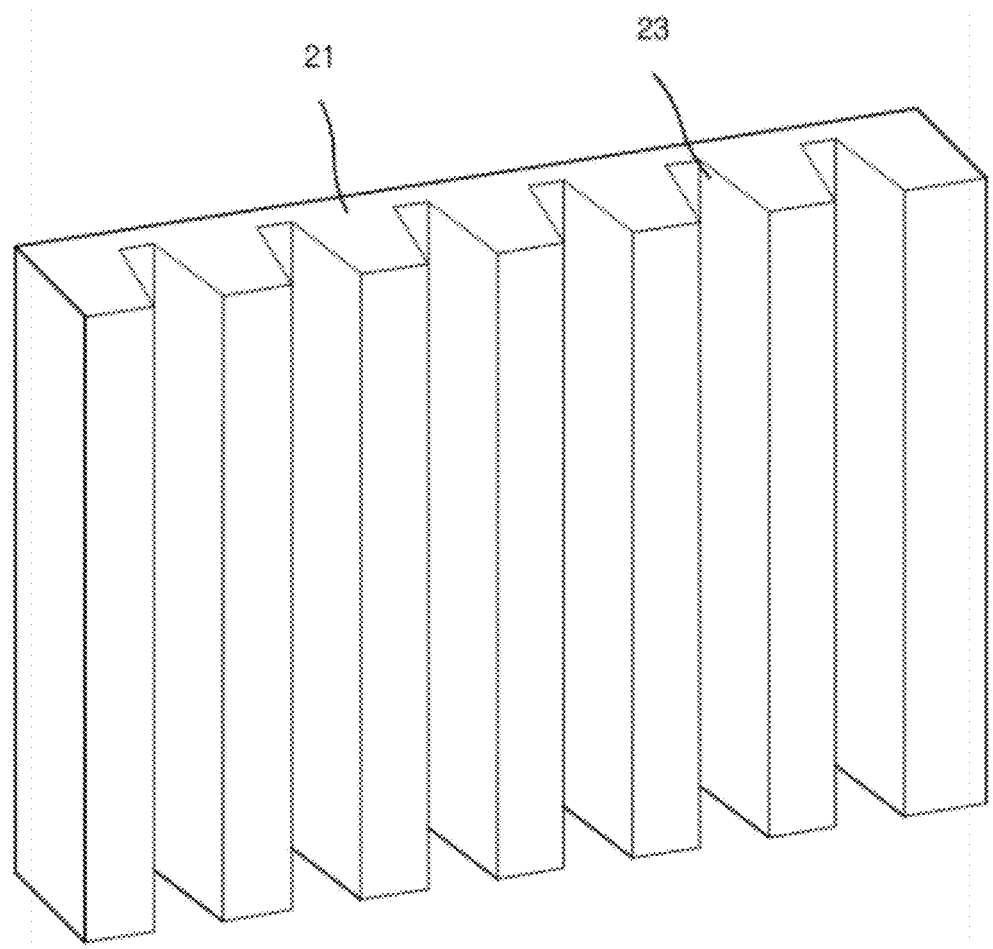

FIG. 6 and FIG. 7 are cross-sectional views showing lens sections of an optical film according to a first comparative example.

The optical film is typically disposed in front of a display panel 10.

As shown in the figures, the optical film 20 includes a background layer 21 and lens sections 23.

The background layer 21 is formed as a layer of light-transmitting material. The background layer 21 may be made of transparent polymer resin, in particular, ultraviolet (UV) curing transparent resin The lens sections 23 are formed by engraving or embossing the background layer 21 to a predetermined depth. The lens sections 23 reduce color shift by refracting light that is incident thereon. The lens sections 23 can reduce the color change that occurs in response to an increase in the viewing angle using a color mixing effect. It is possible to allow more of the light that is emitted in the direction perpendicular to the plane of the display panel to pass through by reducing the width of the lens sections such that it is smaller than the spacing between the lens sections.

The lens sections serve to change the direction of the portion of light that is emitted perpendicular to the plane of the display panel, such that it is not perpendicular thereto, and to change the direction of the portion of light that is not originally emitted perpendicular thereto, such that it is emitted perpendicular thereto. That is, the lens sections can cause color mixing by changing the direction of light based on the viewing angle, thereby reducing color shift.

The lens sections 23 may have a pattern selected from among, but not limited to, stripes having a polygonal cross-section, waves having a polygonal cross-section, a matrix having a polygonal cross-section, a honeycomb having a polygonal cross-section, dots having a polygonal cross-section, stripes having a semicircular cross-section, waves having a semicircular cross-section, a matrix having a semicircular cross-section, a honeycomb having a semicircular cross-section, dots having a semicircular cross-section, stripes having a semi-elliptical cross-section, waves having a semi-elliptical cross-section, a matrix having a semi-elliptical cross-section, a honeycomb having a semi-elliptical cross-section, dots having a semi-elliptical cross-section, stripes having a semi-oval cross-section, waves having a semi-oval cross-section, a matrix having a semi-oval cross-section, a honeycomb having a semi-oval cross-section, and dots having a semi-oval cross-section.

Here, the term "polygonal cross-section" may include, but is not limited to, triangular, trapezoidal and quadrangular cross-sections. In addition, the term "semi-oval cross-section" may include curved profiles other than an arc of a circle and an arc of an ellipse. Further, the terms "semicircular cross-section," "semi-elliptical cross-section," and "semi-oval cross-section" are not limited to the shapes that are obtained by dividing circular, elliptical, or oval shapes precisely into two sections, but include shapes in which part of the outline of the cross-section of the lens sections includes an arc, an elliptical arc, or a parabola. That is, the "semi-elliptical cross-section" may have a shape that has two elliptical arc lateral sides and a linear bottom side. The optical film for reducing color shift of comparative examples is not limited to the above-described shapes, but may have a variety of other shapes. A shape that has a bilaterally symmetrical cross-section is preferable.

In addition, the pattern constituted of stripes may also include a variety of patterns, such as a horizontal stripe pattern, a vertical stripe pattern, and the like. The horizontal stripe pattern is effective in compensating for vertical viewing angles. The vertical stripe pattern, as shown in FIG. 7, is effective in compensating for horizontal viewing angles.

In order to prevent a moiré phenomenon, the lens sections 23 may be formed to have a predetermined bias angle with respect to the edge of the background layer 21. For example, in the stripe pattern, the stripes may have a predetermined angle of inclination with respect to the horizontal or vertical direction.

It is preferred that the lens sections 23 be periodically formed on one surface of the background layer 21, as shown in FIG. 7. The lens sections 23 are spaced apart from each other and are parallel to each other.

Figure 13:
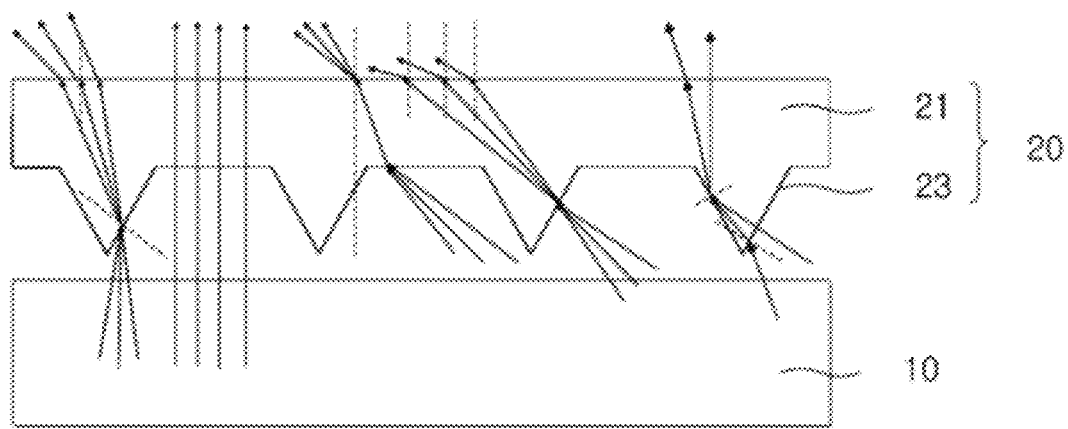

Although FIG. 6 shows an example in which the lens sections 23 are engraved into the background layer 21, the lens sections 23 are not limited thereto. As shown in FIG. 13, the lens sections 23 may be embossed on the background layer.

Figure 8:
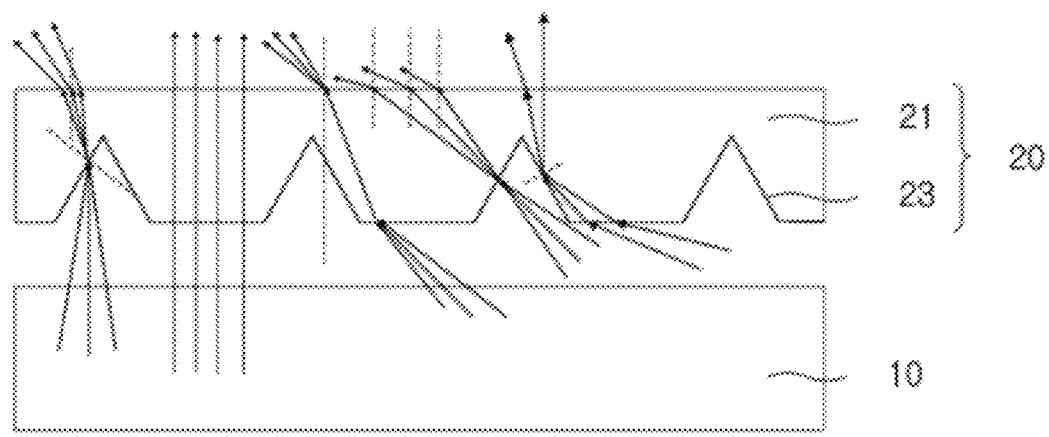
Figure 9:
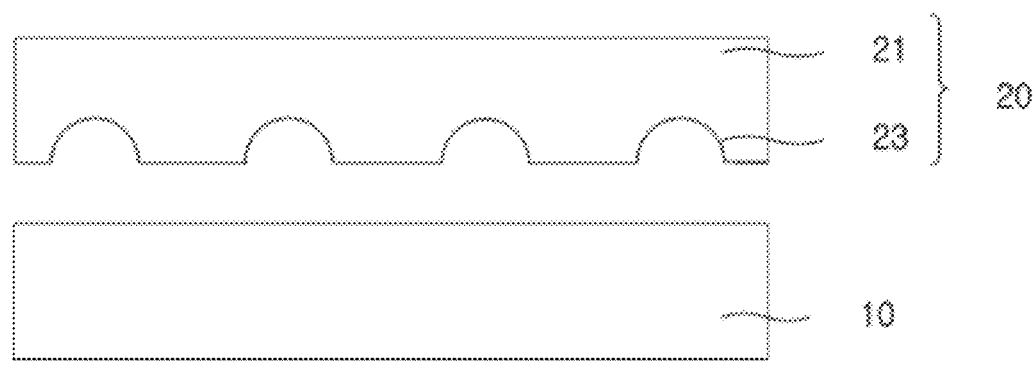

FIG. 8 and FIG. 9 show that the lens sections may have a triangular or semicircular cross-section.

Figure 10:
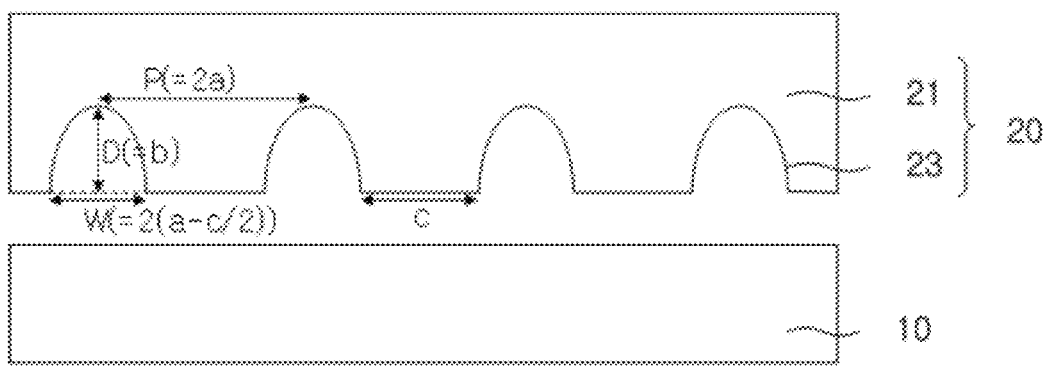
Figure 11:
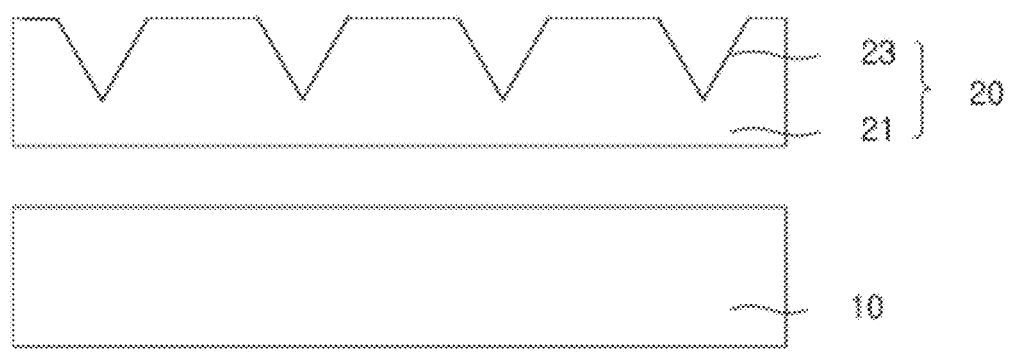
Figure 12:
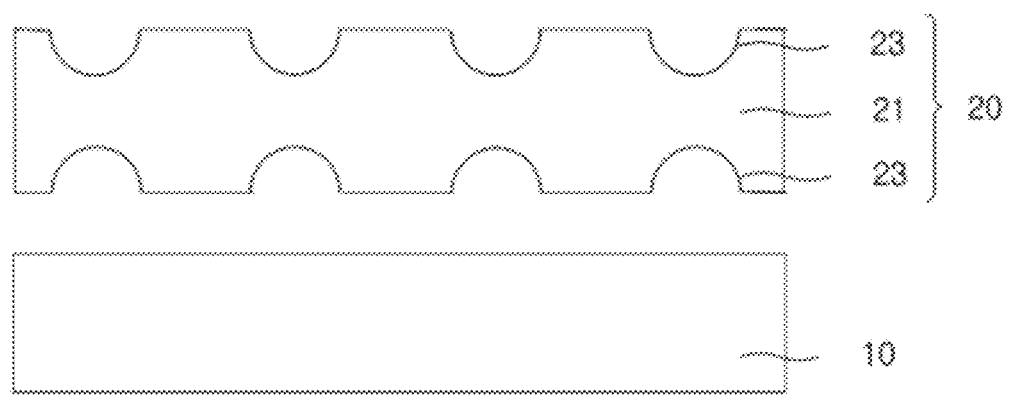

Although the lens sections may be formed in the rear surface of the background layer, which faces the display panel, as shown in FIG. 10, they may be formed in the front surface of the background layer, which faces the viewer, as shown in FIG. 11. In addition, as shown in FIG. 12, the lens sections may be formed on both surfaces of the background layer.

As shown in FIG. 13, the lens sections may be formed as embossments.

Figure 14:
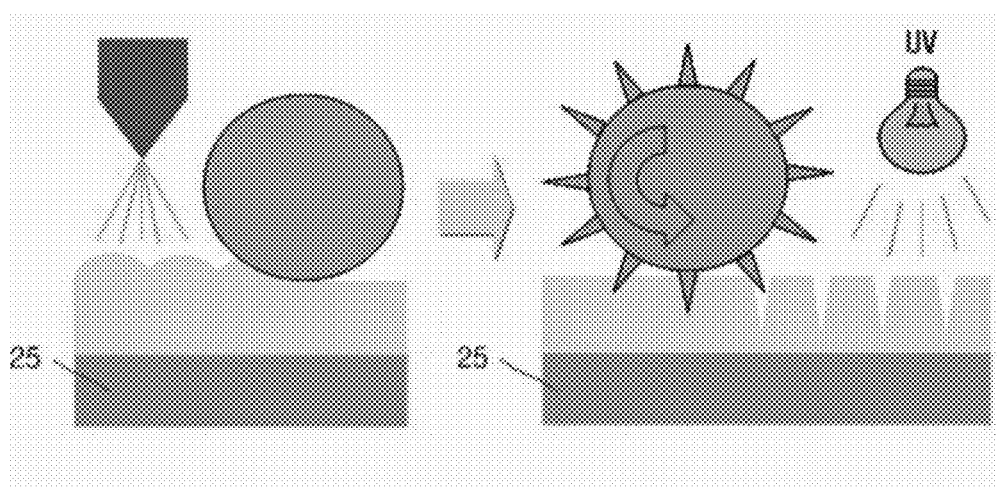
FIG. 14 is a view showing a method for manufacturing an optical film according to a comparative example.

FIG. 14 is a view showing a method of manufacturing an optical film according to a comparative example.

The optical film for reducing color shift may have a backing 25, which supports the background layer 21.

The backing 25 is, preferably, a transparent resin film or a glass substrate that is UV transparent. Available examples of material for the backing 25 may include, but are not limited to, polyethylene terephthalate (PET), polycarbonate (PC), polyvinyl chloride (PVC) and triacetate cellulose (TAC).

A method of preparing the lens sections 23 includes the step of applying a UV-curable resin on one surface of the backing 25, and the step of forming lens sections in the UV-curable resin using a forming roll that has a pattern that is the reverse of that of the lens sections on the surface thereof while radiating UV rays onto the UV-curable resin. Afterwards, the preparation of the background layer 21 having the lens sections 23 is finalized by radiating UV rays onto the UV-curable resin.

However, the optical films of comparative examples are not limited thereto, but the recesses of the background layer may be formed using a variety of methods, such as thermal pressing, which uses thermoplastic resin, injection molding, in which thermoplastic resin or thermosetting resin is injected, or the like.

Figure 15:
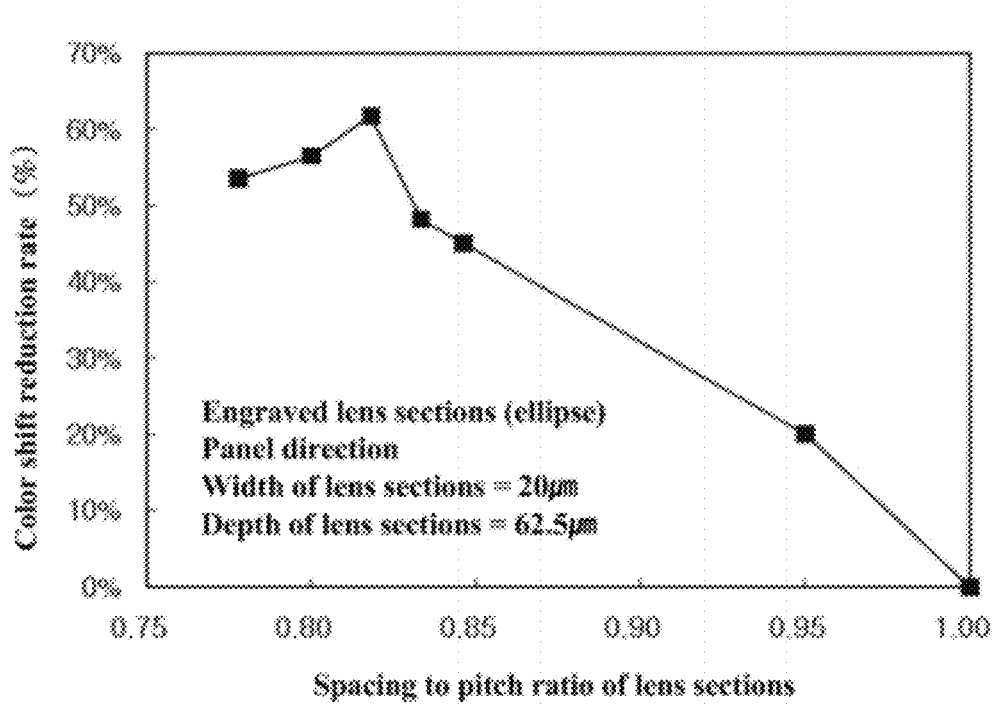
FIG. 15 is a graph showing the relationship between the spacing (C) to pitch (P) ratio of the lens sections and the rate of color shift reduction.

FIG. 15 is a graph showing the relationship between the spacing (C) to pitch (P) ratio of the lens sections and the rate of color shift reduction.

The degree of color shift $\Delta u'v'$ that is discernible with the human eye is 0.004 or more. The S-IPS display panel having the best color shift characteristics exhibits a maximum color shift $\Delta u'v'$ of 0.02 at viewing angles ranging from 0 degrees to 60 degrees. Therefore, the magnitude of color shift reduction is required to be 20% or more (that is, maximum $\Delta u'v'$ is required to be 0.016 or less) in order to attain a reduction in color shift that is discernible with the human eye. It can be appreciated from the graph of FIG. 15 that the depth-to-width ratio of the lens sections is required to be 0.95 or more in order for the color shift reduction to be 20% or more.

Figure 16:
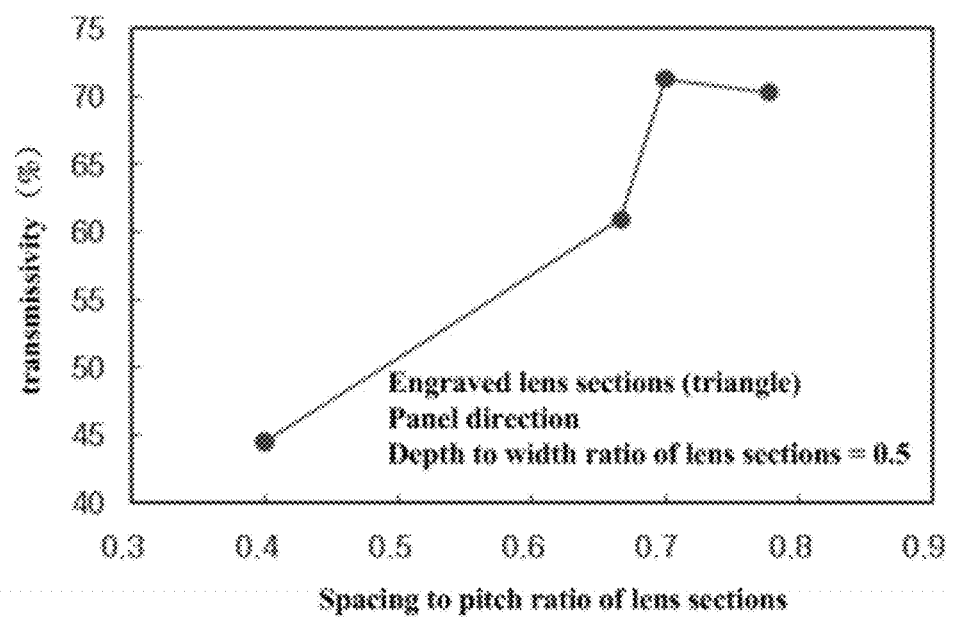
FIG. 16 is a graph showing the relationship between the spacing (C) to pitch (P) ratio of the lens sections and transmissivity.

FIG. 16 is a graph showing the relationship between the spacing (C) to pitch (P) ratio of the lens sections and transmissivity.

As shown in the graph of FIG. 16, the greater the spacing-to-pitch ratio of the lens sections, the greater the light transmissivity of the film. A film having a light transmissivity of 50% or more is viable as a commercial product. Accordingly, the spacing-to-pitch ratio of the lens sections is required to be 0.5 or more in order for the transmissivity to be 50% or more.

Therefore, the graphs shown in FIG. 15 and FIG. 16 show that the spacing-to-pitch ratio of the lens sections are preferably in the range from 0.5 to 0.95.

FIG. 17 to FIG. 22 are views showing the relationship between the cross-sectional shape of lens sections and ghosts.

Figure 17:
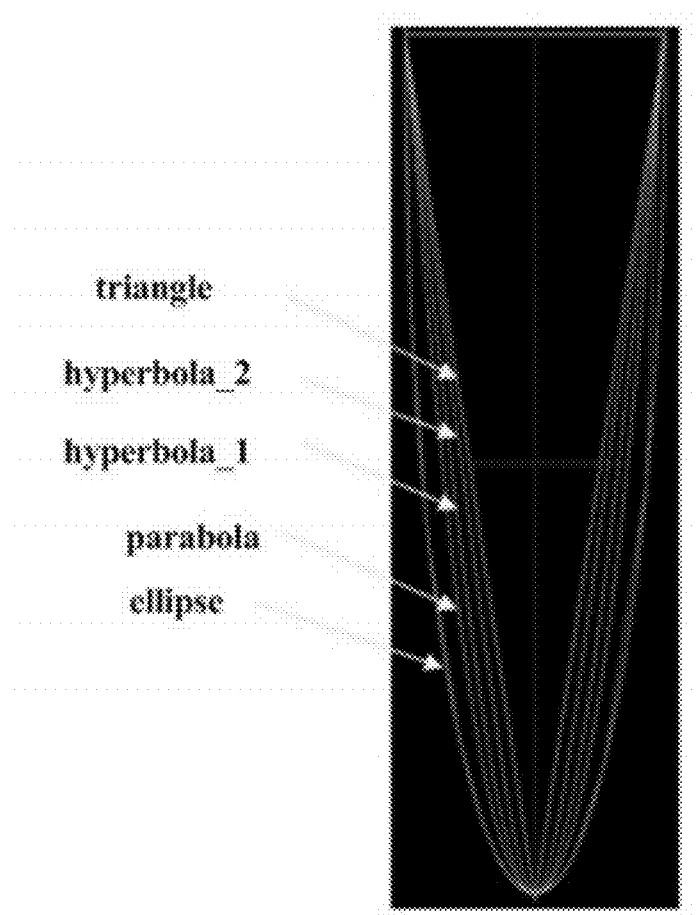
FIG. 17 to FIG. 22 are views showing the relationship between the cross-sectional shape of the lens sections and ghosts.
Figure 18:
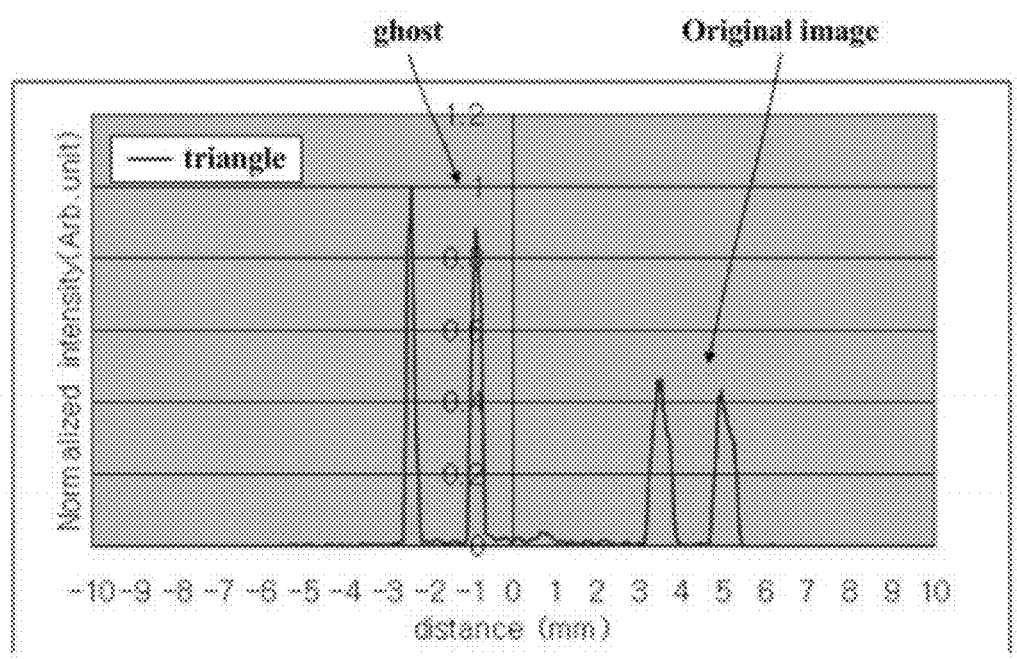
Figure 19:
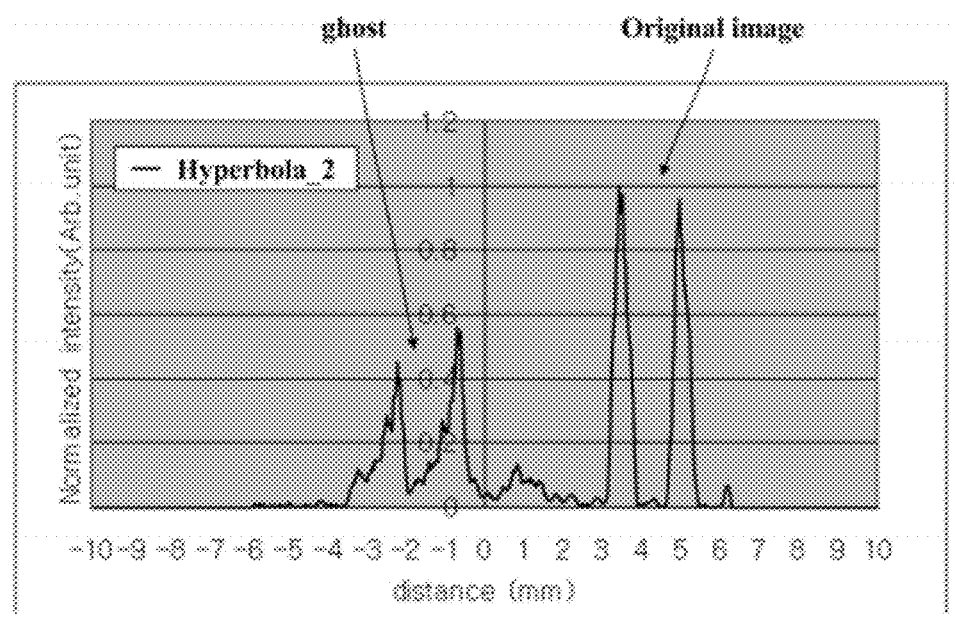
Figure 20:
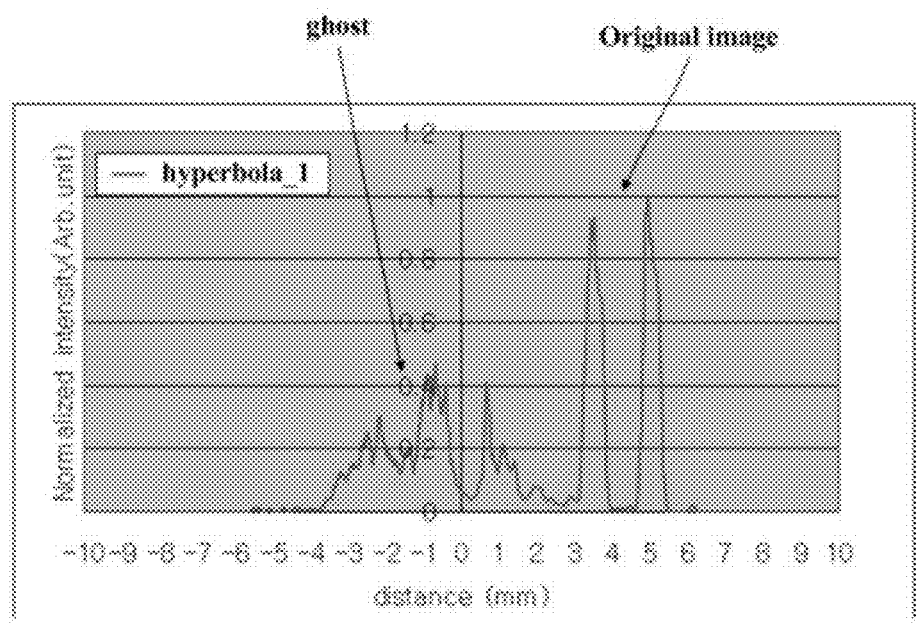
Figure 21:
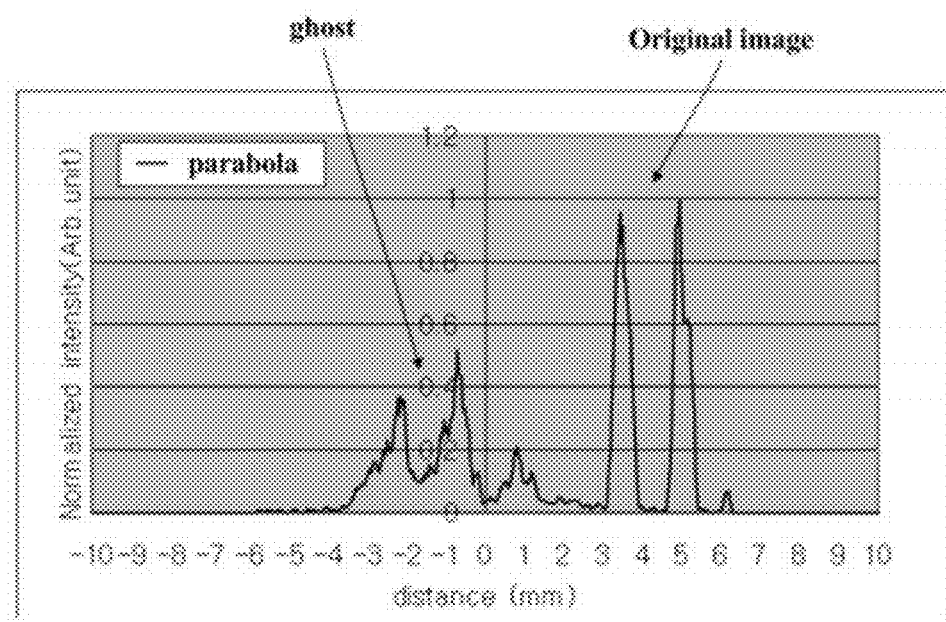
Figure 22:
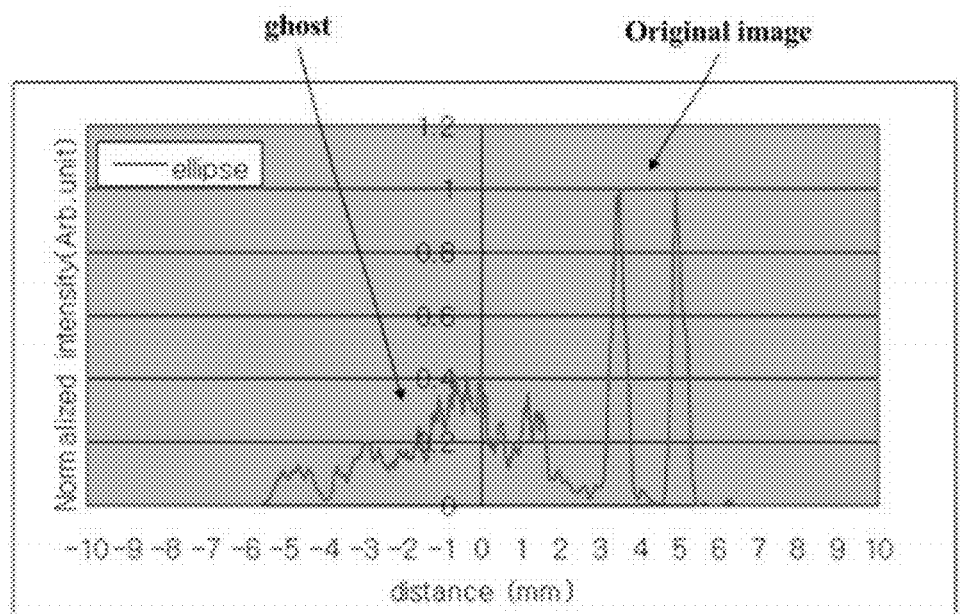

The occurrence of a ghost was observed while the curvature of the lens sections (having a width of 27 μm, a depth of 81 μm and a pitch of 90 μm) was varied. As shown in FIG. 17, it can be appreciated that lens sections having a semi-elliptical cross section prevent the ghost most effectively.

The ghost (false image) is observed more distinctly as the shape is changed from a semi-elliptical shape to a triangular shape, that is, as the curvature decreases. FIG. 18 to FIG. 24 are graphs showing the luminance distributions of ghosts compared with those of original images.

FIG. 23 to FIG. 28 are views showing that ghosts and hazing can be prevented by disposing the optical film for reducing color shift according to a comparative example such that the optical film is in close contact with the display panel.

Figure 23:
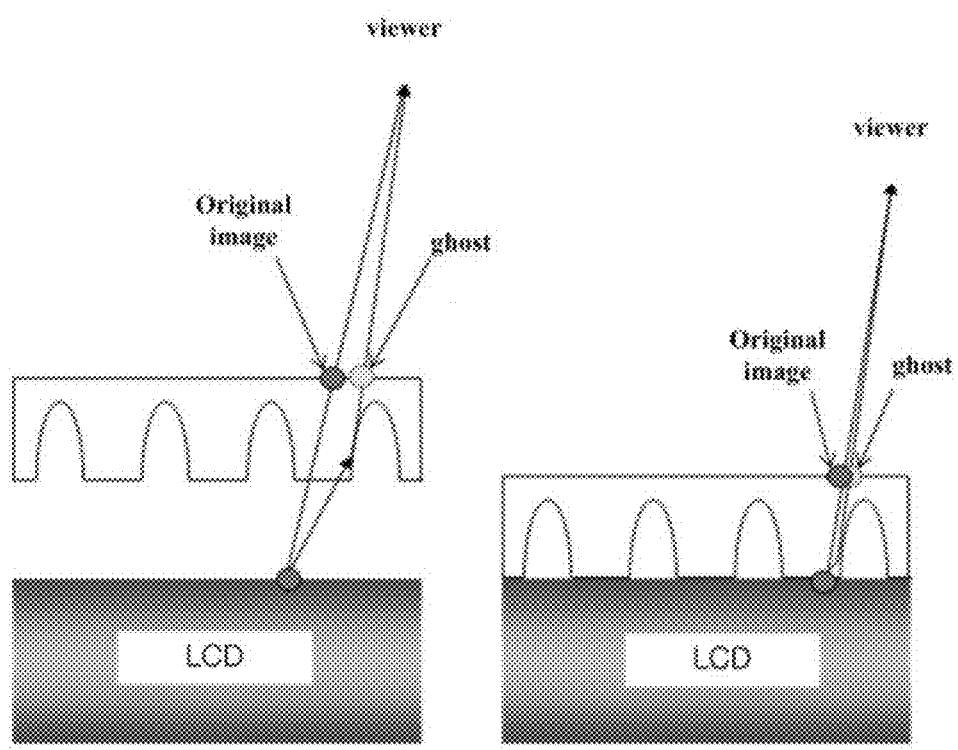
FIG. 23 to FIG. 28 are views showing that ghosts and hazing can be prevented by disposing an optical film for reducing color shift according to a comparative example such that it is in close contact with a display panel.

When the optical film for reducing color shift according to a comparative example is mounted in front of the display panel, spacing the optical film farther apart from the display panel makes the ghost look more distinct, as shown in FIG. 23. (When the optical film is in close contact with the display panel, it is difficult to distinguish the ghost from the original image because the gap between the ghost and the original image is very small, as will be described below.) The ghost distorts the image on the display panel. Therefore, a solution that can reduce color shift without causing a ghost is required.

Figure 24:
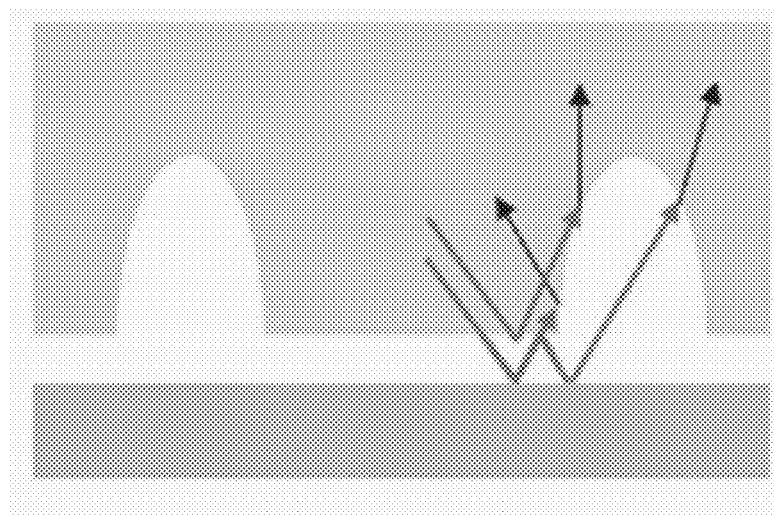

In addition, when the optical film for reducing color shift is provided such that it is spaced apart from the display panel, not only the foregoing problem of ghosts, but also the problem of haze occurs, as shown in FIG. 24, since the lens sections diffuse light reflected from the display panel and the flat surfaces between the lens sections. That is, light incident onto the optical film and the display panel is reflected, one or multiple times, from the interface between the optical film and the air and from the interface between the air and the display panel and then is incident onto the lens sections. The lens sections diffuse the incident light, which causes hazing. This phenomenon reduces bright-room contrast ratio (BRCR), thereby reducing the visibility of the display device. Therefore, a solution that can prevent ghosts and hazing from occurring in the optical film for reducing color shift is required.

Figure 25:
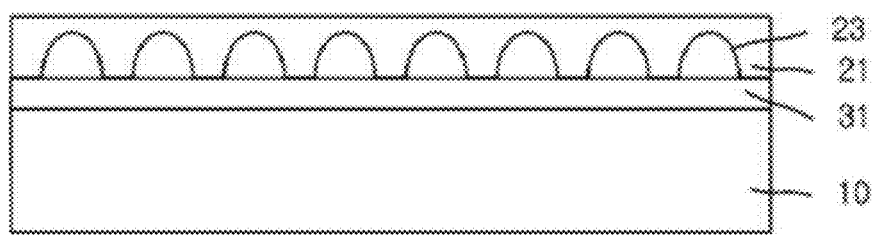
Figure 26:
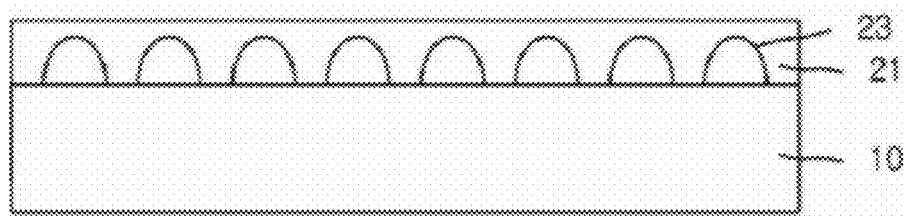

FIG. 25 and FIG. 26 are views showing a solution to remove ghosts and hazing in the optical film for reducing color shift according to comparative examples.

It is possible to remove ghosts and hazing by bringing the optical film into close contact with the display panel. For example, it is possible to prevent ghosts and hazing and improve transmissivity by attaching the optical film for reducing color shift to the display panel by means of an adhesive, as shown in FIG. 25, or by forming a background layer from a material having a self-adhesive property and then directly attaching the background layer to the display panel, as shown in FIG. 26. In addition, it is also possible to simply bring the optical film into close contact with the display panel without adhering it thereto such that no air gap is interposed between the optical film and the display panel.

Here, it is also preferable that the lens sections be directed toward the display panel instead of toward the viewer, in terms of reducing hazing. (This is the same when the optical film for reducing color shift is spaced apart from the display panel.)

Here, the background layer may be made of UV-curable transparent elastomer such that it can be easily attached directly to the display panel. Available materials for the background layer may include, but are not limited to, acrylic elastomer, silicone-based elastomer (polydimethylsiloxane:

PDMS), urethane-based elastomer, polyvinyl butyral (PMB) elastomer, ethylene vinyl acetate (EVA)-based elastomer, polyvinyl ether (PVE)-based elastomer, saturated amorphous polyester-based elastomer, melamine resin-based elastomer, and the like.

Figure 27:
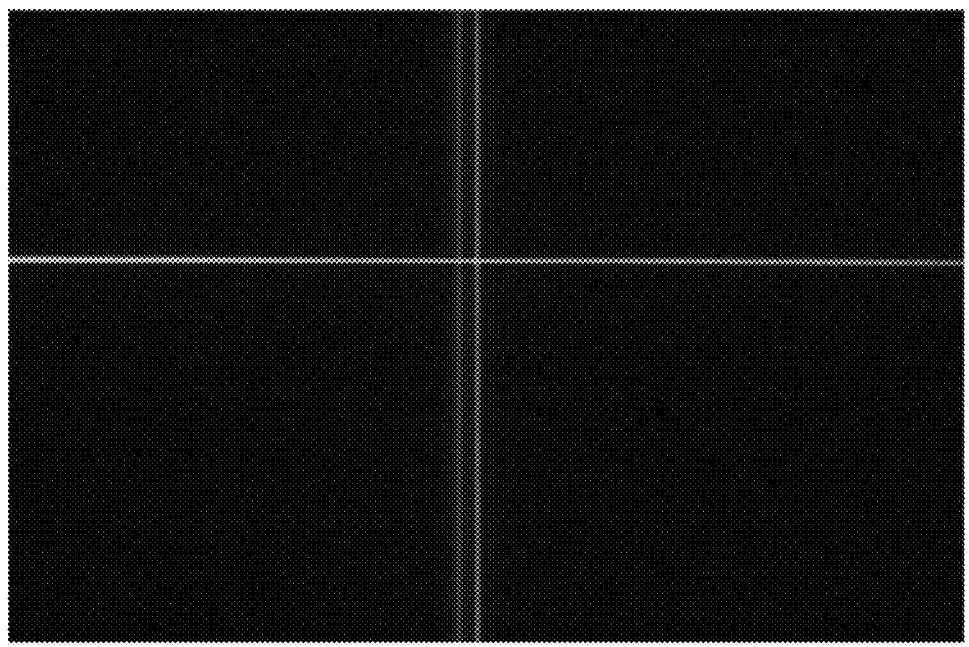
Figure 28:
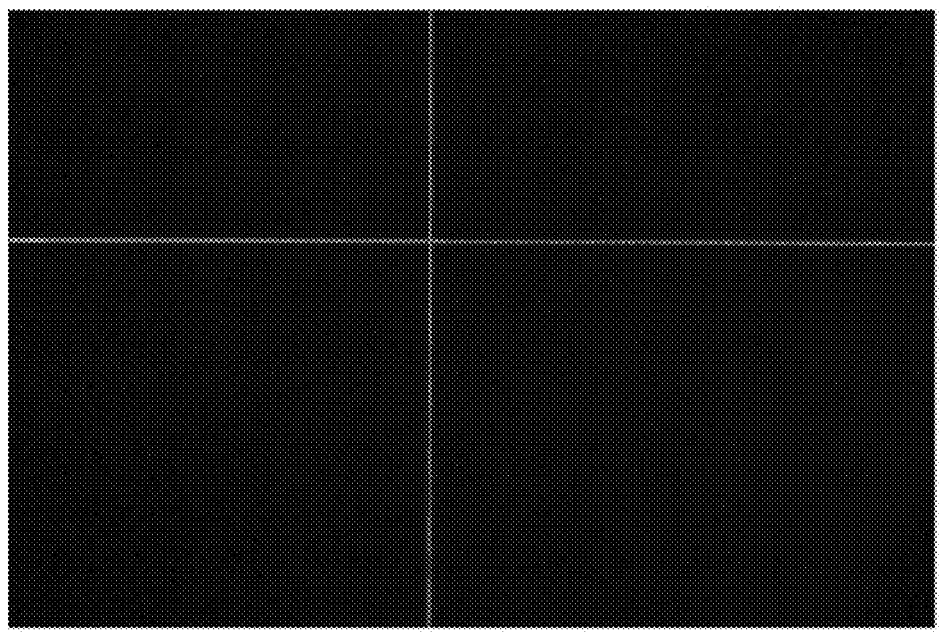

FIG. 27 is a view showing that a ghost occurs when the optical film for reducing color shift is provided such that it is spaced apart from the display panel, and FIG. 28 is a view showing that the ghost is eliminated from the display device shown in FIG. 25.

Table 1 below presents the results obtained by measuring hazing in a display device in which the optical film for reducing color shift is spaced apart from the display panel, and in the display device shown in FIG. 25.

TABLE 1

| Sample | Luminance measured at a viewing angle of 60° |
|---|---|
| Black panel | 1.73 nit |
| Display panel/Air/Film having lens sections with semi-elliptical cross-section | 12.27 nit |
| Display panel/PSA/Film having lens sections with semi-elliptical cross-section | 2.58 nit |
| Display panel/Air/PET film | 3.87 nit |

Measurement was carried out using illuminant D65, having 240 lux as an external light source by attaching the samples to black substrates and then measuring the luminance of reflected light at a horizontal viewing angle of 60°. Since the external light source exists at a place higher than the samples, specular reflection could be observed from below the samples, and irregular reflection could be observed from all directions. Therefore, the reflection hazing caused by external light was measured by detecting irregularly reflected light at a horizontal viewing angle of 60°, rather than from below the samples.

When the optical film for reducing color shift was adhered (or directly attached) to the display panel, the reflection haze was measured to be 2.58 nit, which is very small compared to when the optical film was spaced apart from the display panel to thus form an air gap therebetween. It can be appreciated that the reflection hazing was significantly reduced even in comparison with the case in which the simple PET film without the lens sections is used.

Figure 1:
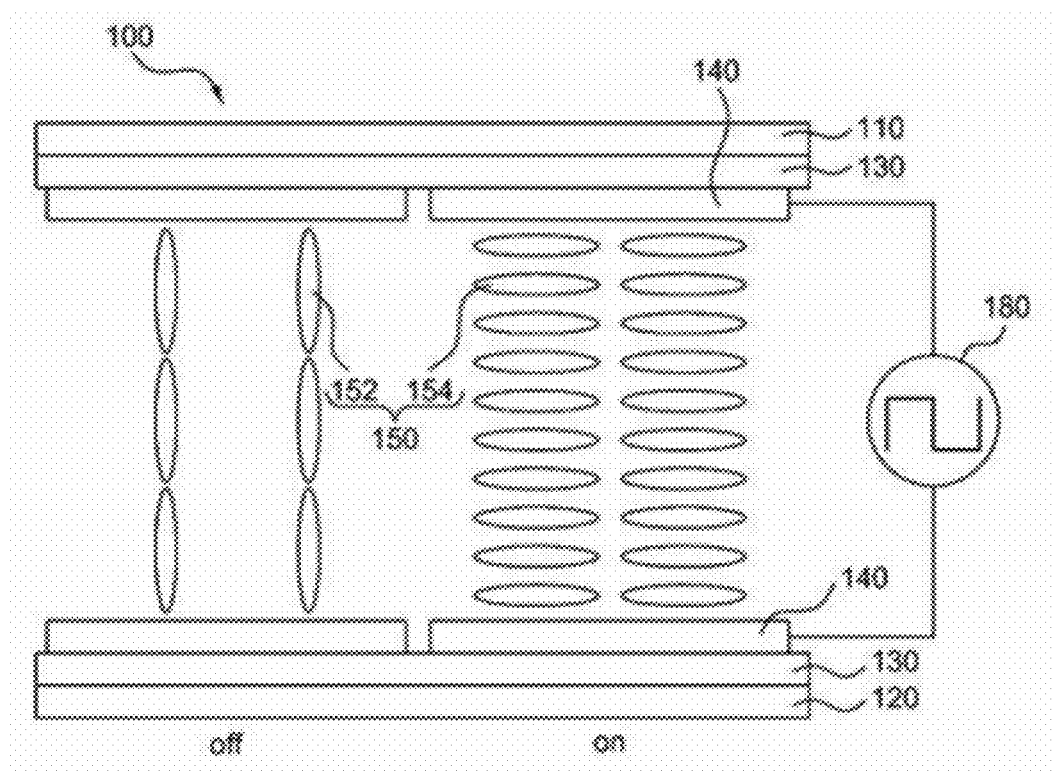
FIG. 1 is a conceptual view schematically showing the basic structure and operating principle of an LCD.
Figure 2:
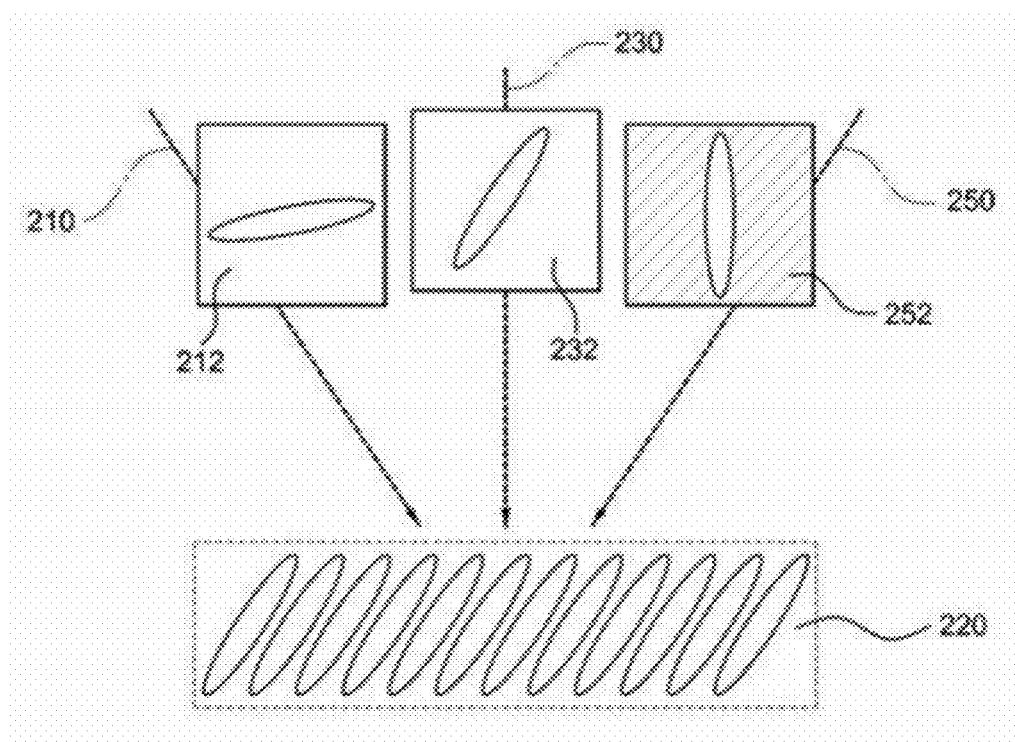
FIG. 2 is a conceptual view showing the orientation and optical transmissivity of liquid crystals depending on the viewing angle.
Figure 3:
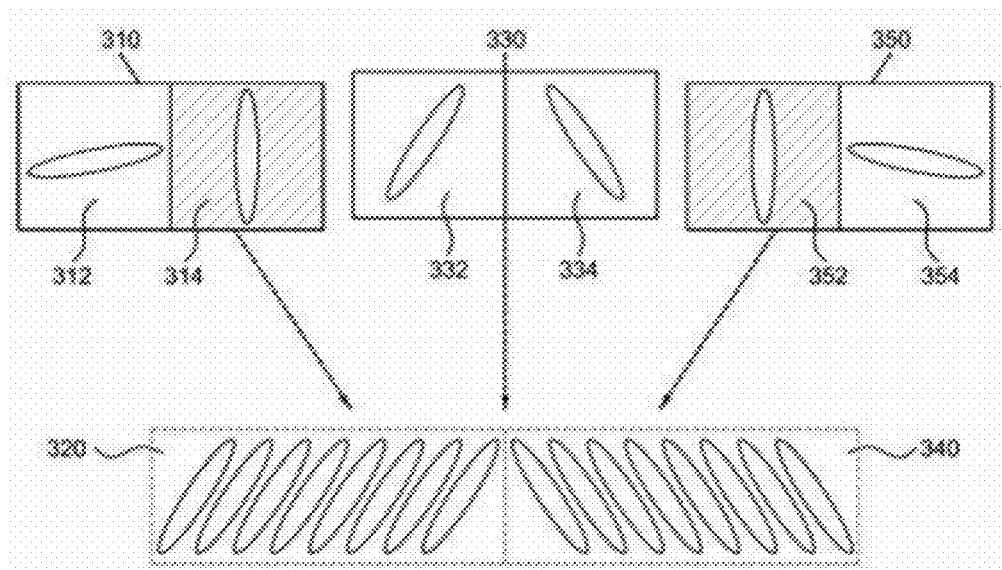
FIG. 3 is a conceptual view showing a conventional attempt to reduce variation in the contrast ratio and color shift depending on the viewing angle.
Figure 4:
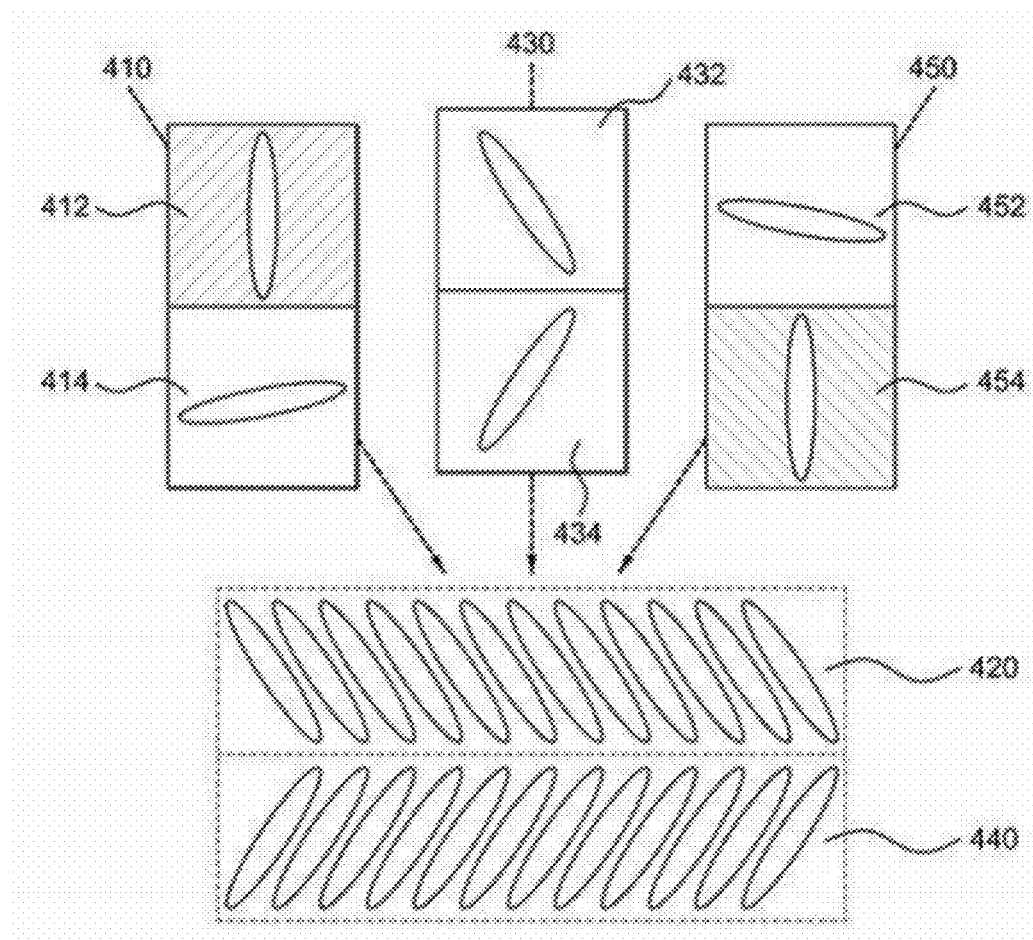
FIG. 4 is a conceptual view showing another conventional attempt to reduce variation in the contrast ratio and color shift depending on the viewing angle.
Figure 5:
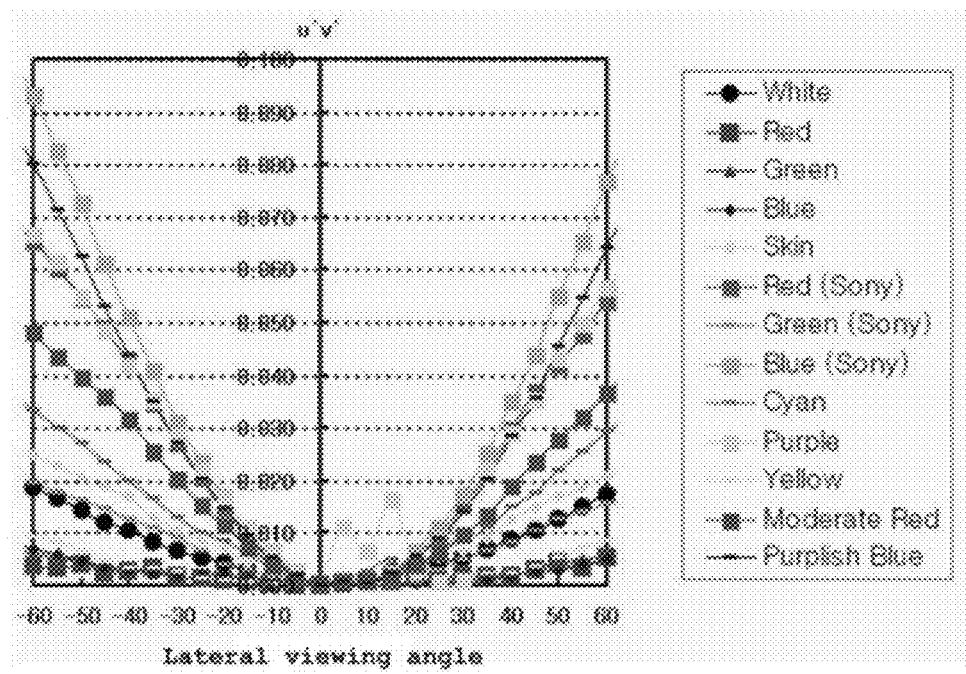
FIG. 5 is a graph showing color shift depending on the viewing angle for an LCD on which an optical film for reducing an color shift is not mounted.
Figure 29:
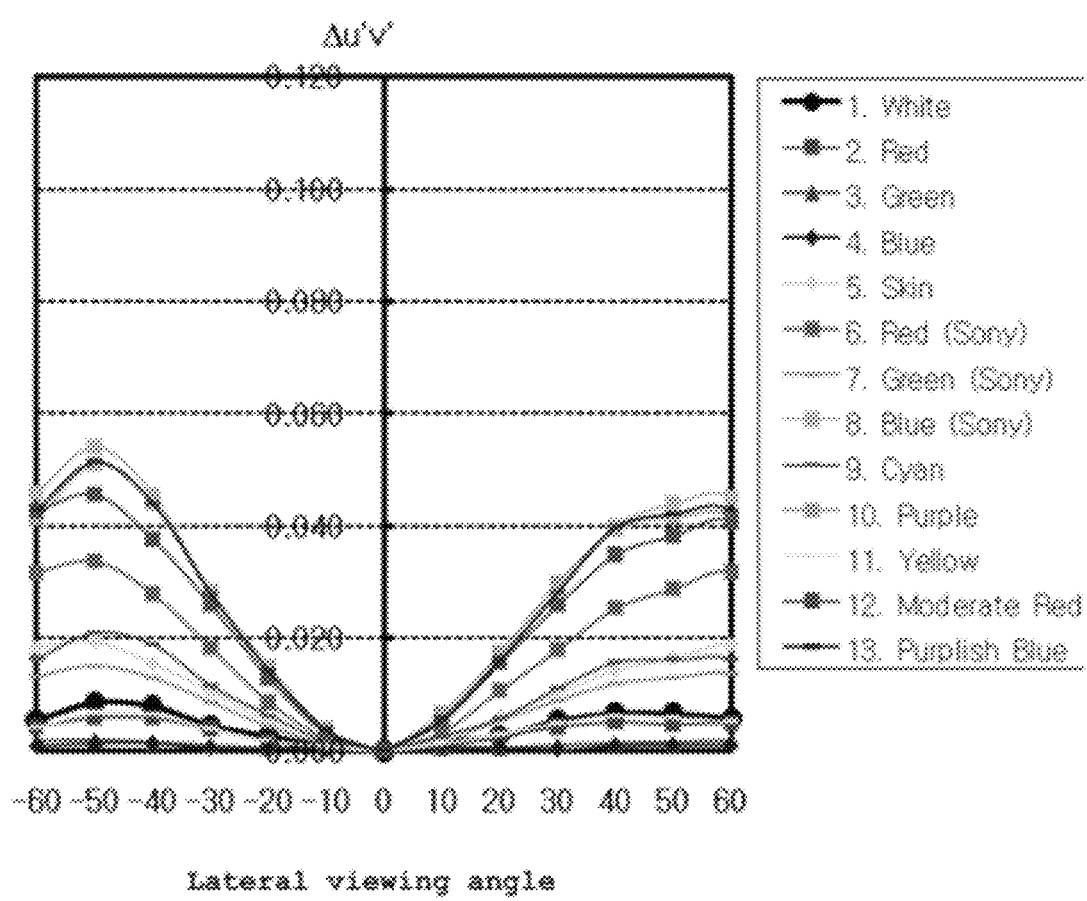
FIG. 29 is a graph showing the result obtained by attaching a self-adhesive optical film for reducing color shift according to a comparative example to a display panel in an S-PVA mode LCD TV and then measuring the rate of color shift reduction.

FIG. 29 is a graph showing the result obtained by attaching the self-adhesive optical film for reducing color shift (in which lens sections have a semi-elliptical cross-section with a width of 30 μm, a depth of 60 μm and a pitch of 83 μm) to the display panel in an S-PVA mode LCD TV, which has the color shift shown in FIG. 5, and then measuring the rate of color shift reduction.

The color shift reduction rate in FIG. 29 was 52%.

Figure 30:
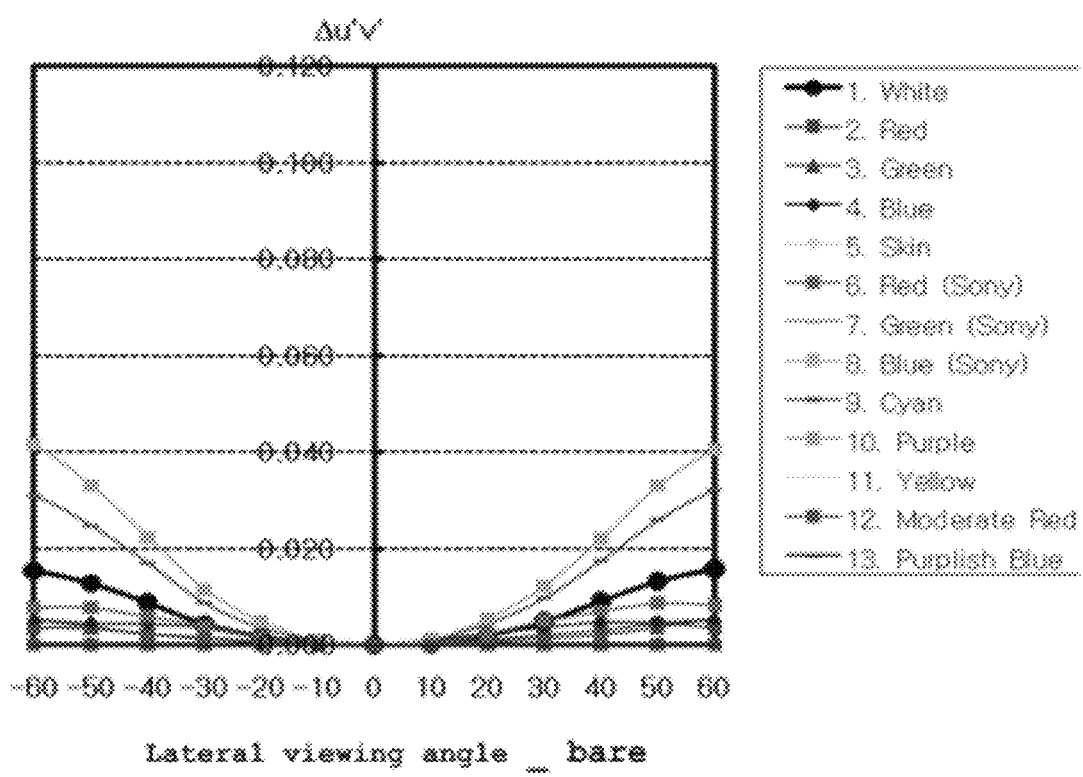
FIG. 30 is a graph showing color shift in an S-IPS mode LCD TV without an optical film for reducing color shift according to a comparative example.
Figure 31:
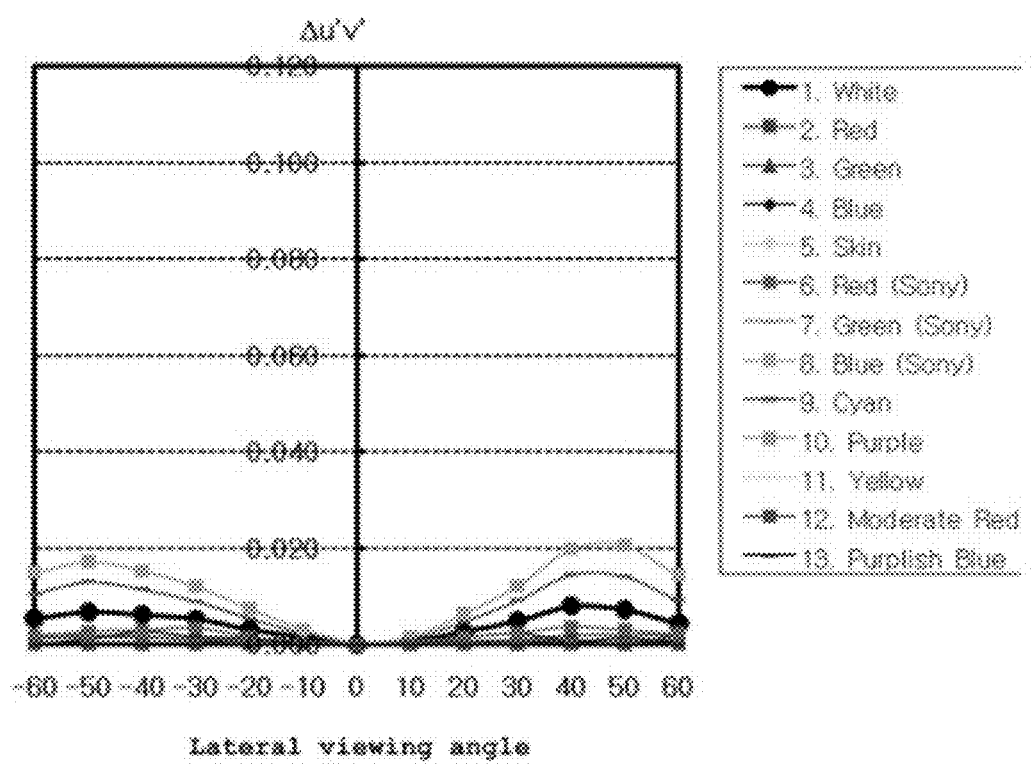
FIG. 31 is a graph showing the result obtained by attaching a self-adhesive optical film for reducing color shift according to a comparative example to the display panel in the LCD TV of FIG. 30 and then measuring the rate of color shift reduction.

FIG. 30 is a graph showing color shift in an S-IPS mode LCD TV without an optical film for reducing color shift according to a comparative example, and FIG. 31 is a graph showing the result obtained by attaching a self-adhesive optical film for reducing color shift according to a comparative example (lens sections have a semielliptical cross section with a width of 30 μm, a depth of 60 μm and a pitch of 83 μm) to the display panel in the LCD TV of FIG. 30 and then measuring the rate of color shift reduction.

The color shift reduction was 50%.

In addition, the effect of reducing color shift can also be obtained from a TN mode LCD. In particular, the TN mode LCD can obtain the effect of reducing grayscale inversion, as described later.

FIG. 32 to FIG. 35 are graphs showing that an optical film for reducing color shift according to a comparative example reduces color shift, grayscale inversion and gamma-curve distortion in an LCD monitor (model number: B2440 MH) that employs a CCFL BLU and a TN panel.

Figure 32:
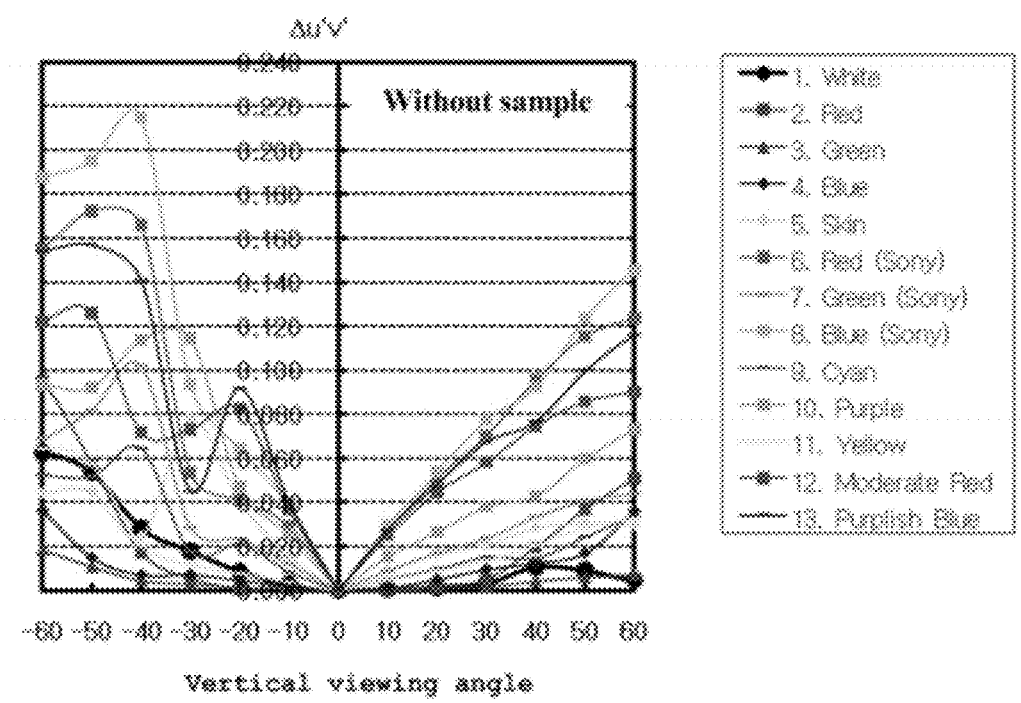
FIG. 32 to FIG. 35 are graphs showing that an optical film for reducing color shift according to a comparative example reduces color shift, grayscale inversion and gamma-curve distortion in an LCD monitor (model number: B2440 MH) that employs a CCFL BLU and a TN panel.
Figure 33:
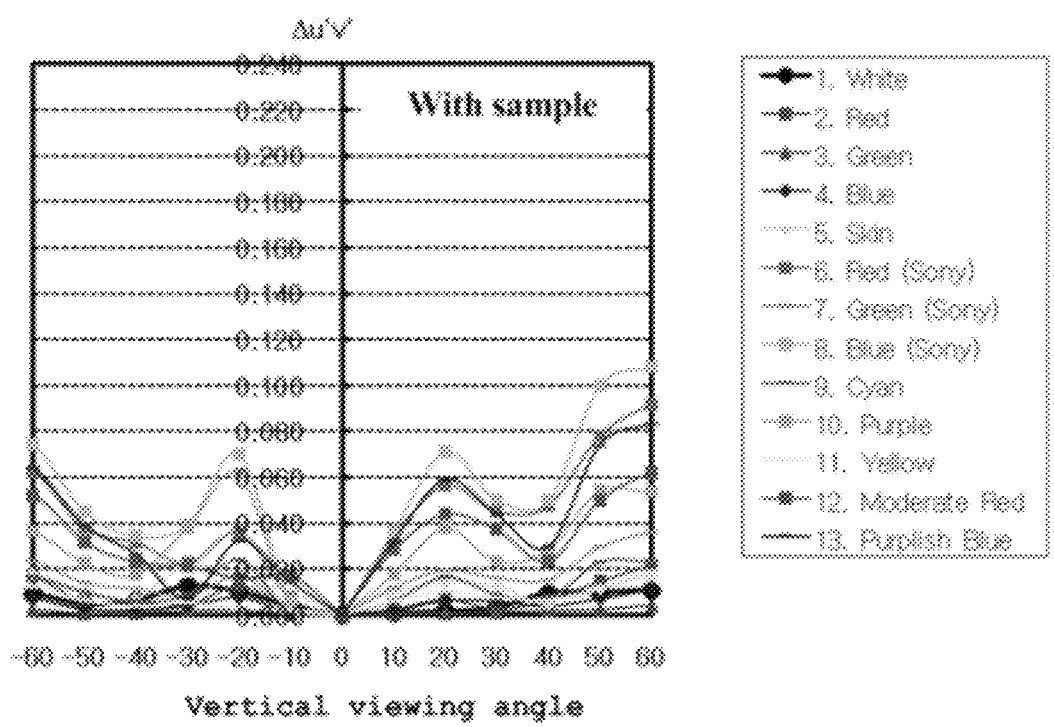

In order to measure the degree of color shift reduction, an SS320 goniometer was used as a measuring device. FIG. 32 was obtained by measuring color coordinates at vertical viewing angles ranging from 0 to 60° at an interval of 10° and then converting the color coordinates into color shift. FIG. 33 was obtained by directly attaching an optical film sample to the display panel and then measuring and converting in the same manner. As can be seen, the ratios of color shift reduction were 25.5% (up) and 65.4% (down).

Figure 34:
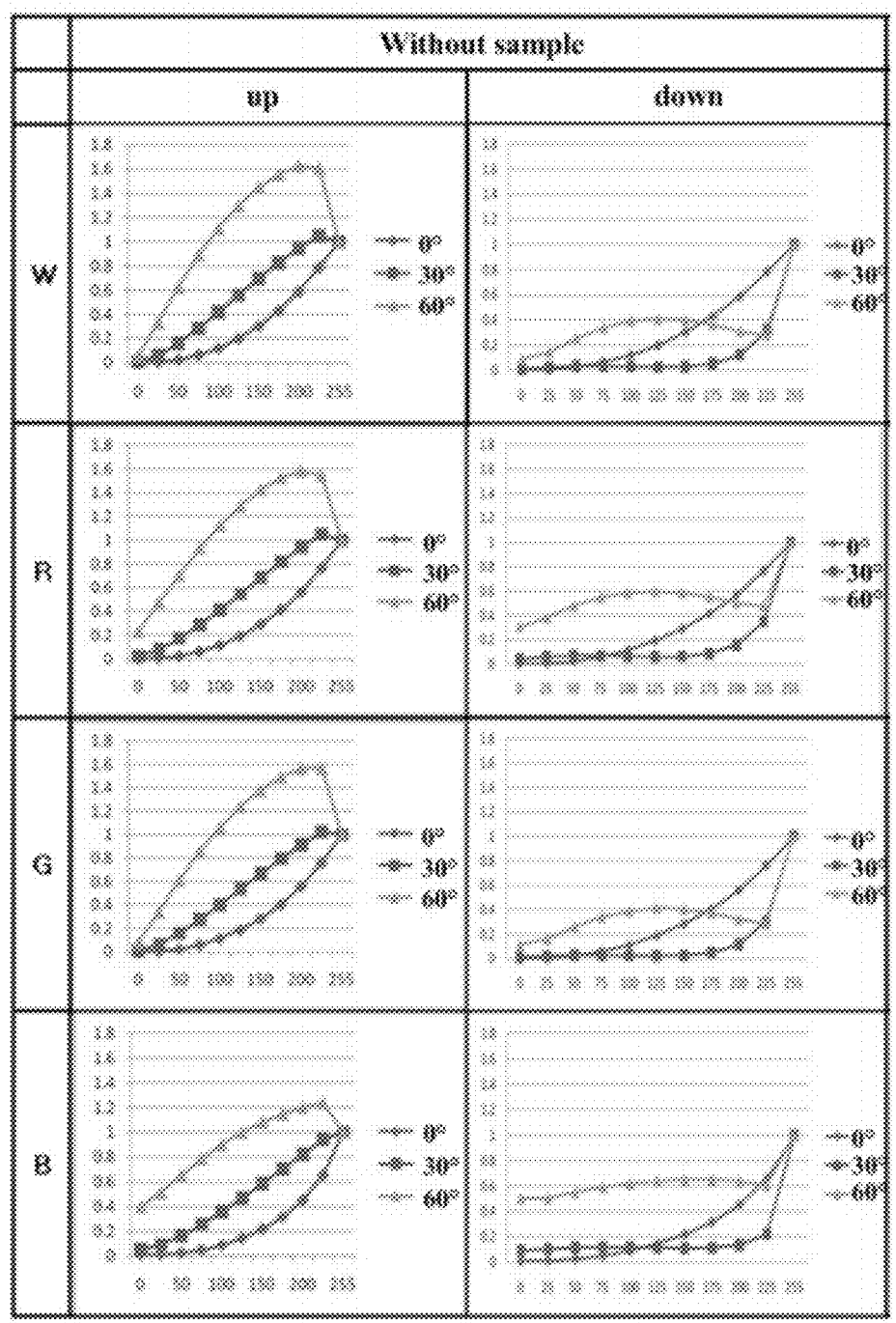
Figure 35:
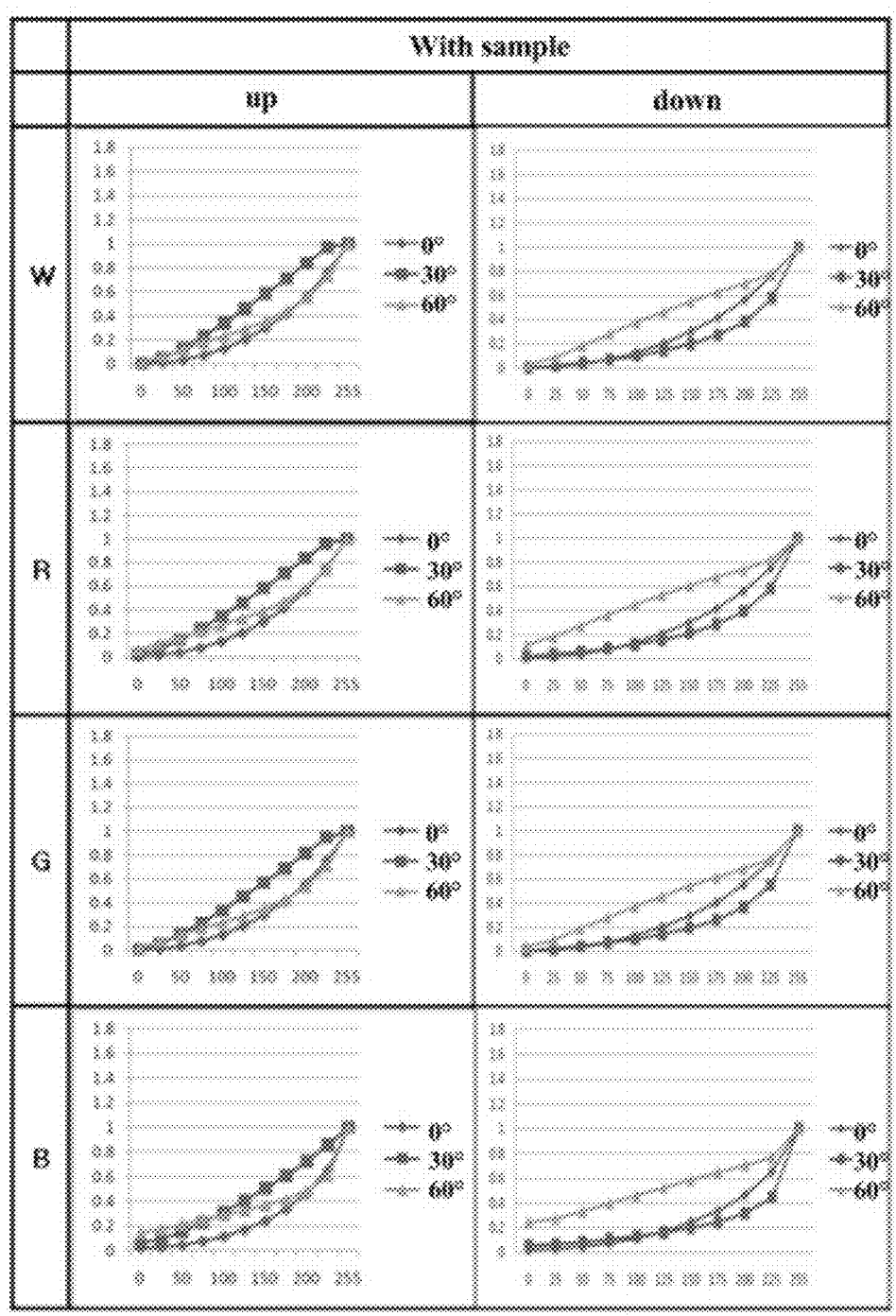

In order to measure the degree of reduction in grayscale inversion and gamma-curve distortion, a CS-1000 was used as a measuring device. FIG. 34 was obtained by measuring luminances with respect to gray levels of W, R, G and B at vertical viewing angles of 0° (the front), 30° and 60°. FIG. 35 was obtained by directly attaching an optical film sample to the display panel and then measuring in the same manner. As can be seen, when the optical film was used, grayscale inversion was reduced as a result of the recovery of gamma-curve linearity, the difference between gamma-curves was significantly decreased, and gamma-curve distortion was decreased.

FIGS. 36 to 39 are graphs showing that the optical film for reducing color shift according to a comparative example reduces color shift, grayscale inversion and gamma-curve distortion in an LCD monitor (model number: BX2440) that employs an LED BLU and a TN panel.

Figure 36:
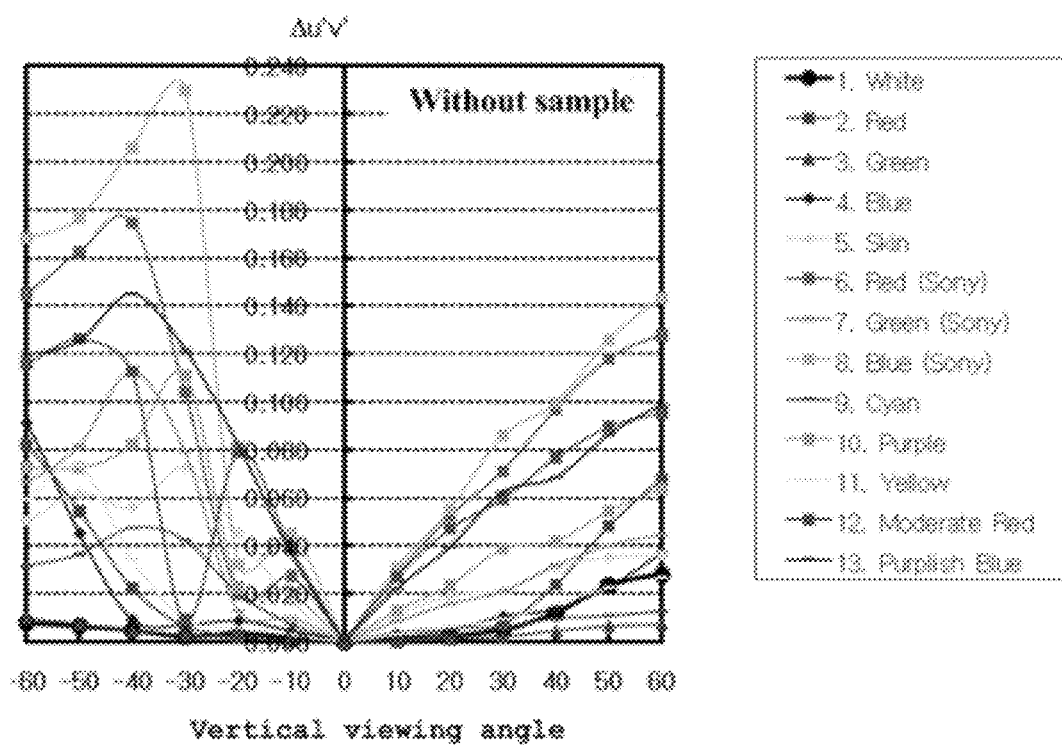
FIG. 36 to 39 are graphs showing that an optical film for reducing color shift according to a comparative example reduces color shift, grayscale inversion and gamma-curve distortion in an LCD monitor (model number: BX2440) that employs an LED BLU and a TN panel.
Figure 37:
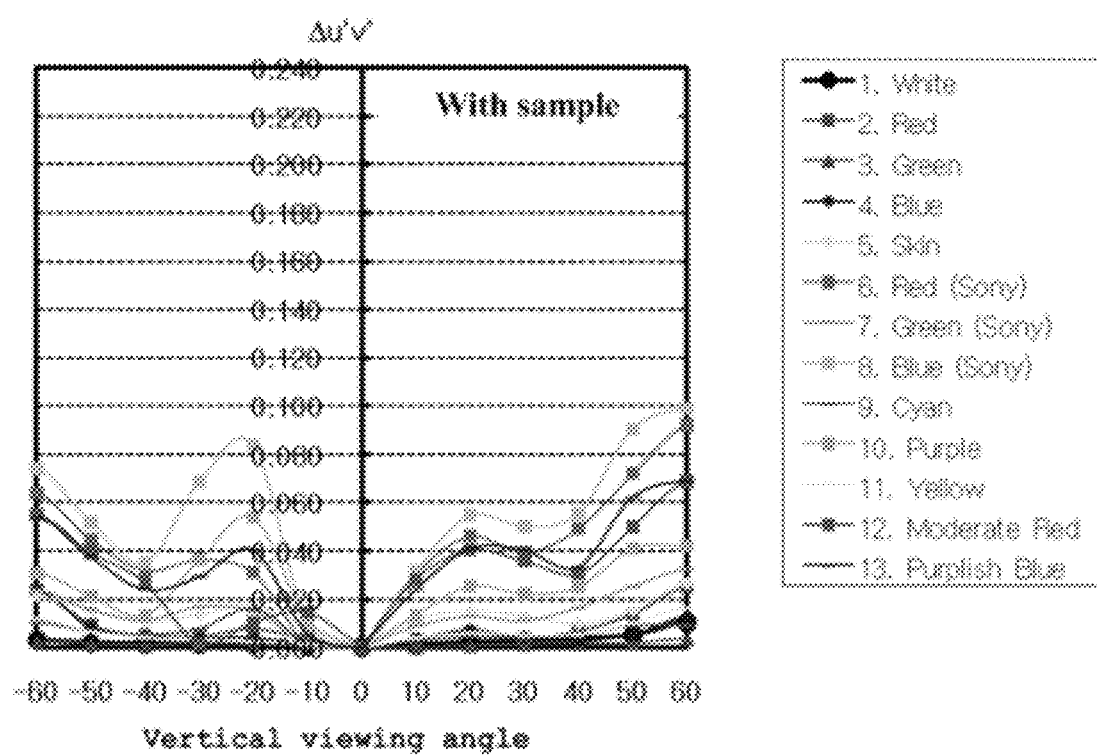

In order to measure the degree of color shift reduction, an SS320 goniometer was used as a measuring device. FIG. 36 was obtained by measuring color coordinates at vertical viewing angles ranging from 0 to 60° at an interval of 10° and then converting the color coordinates into color shift. FIG. 37 was obtained by directly attaching an optical film sample to the display panel and then measuring and converting in the same manner. As can be seen, the ratios of color shift reduction were 30.9% (up) and 63.5% (down).

Figure 38:
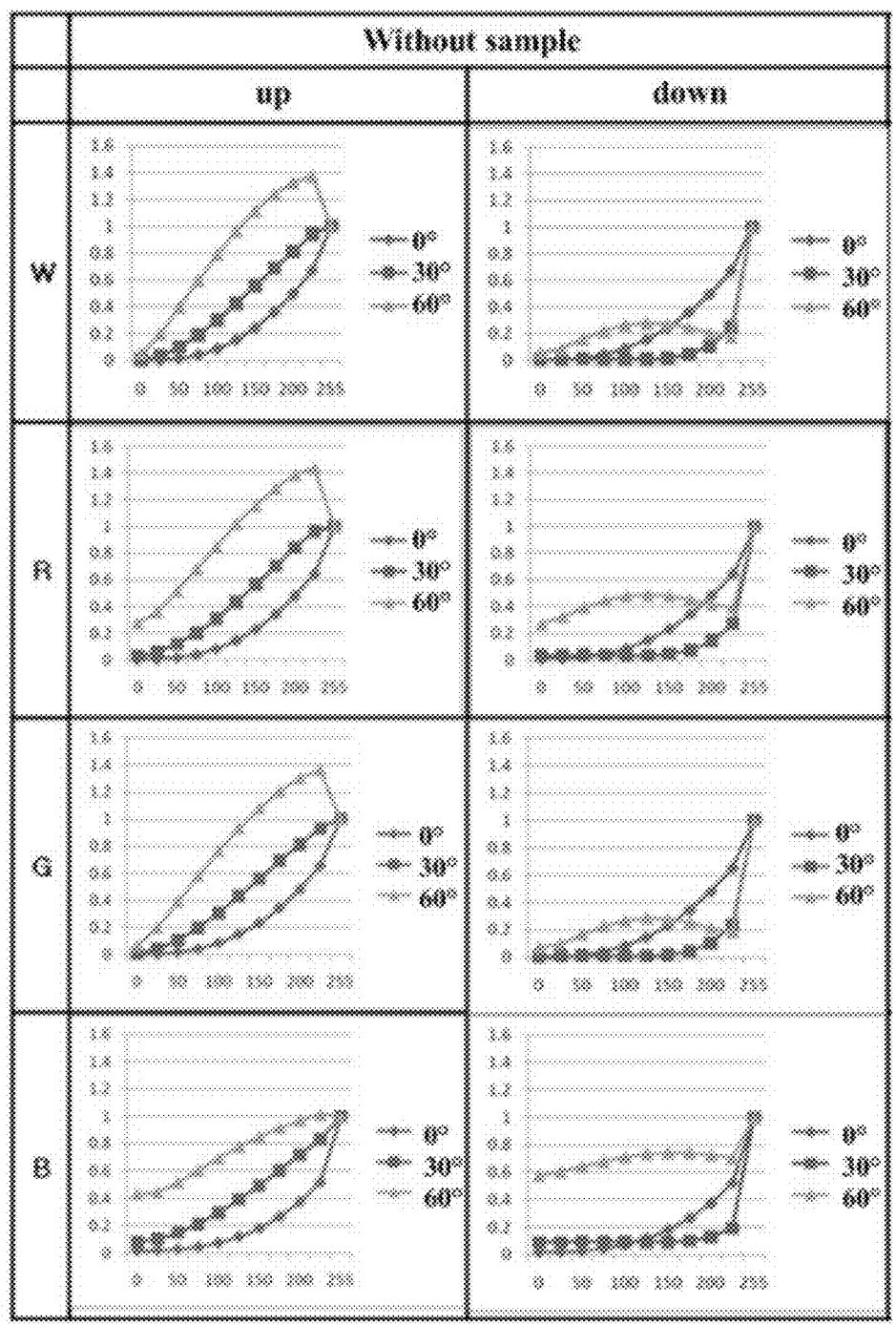
Figure 39:
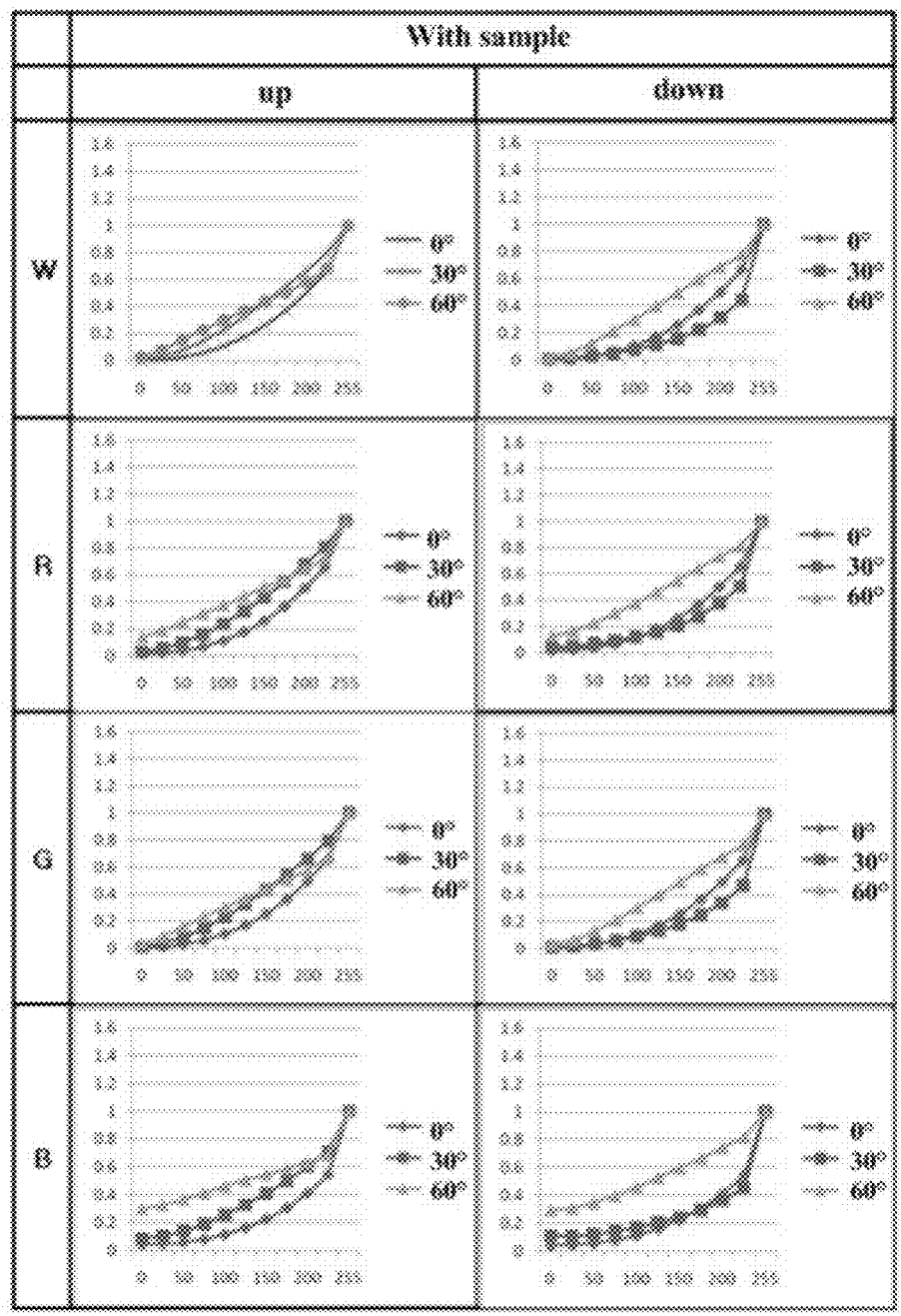

In order to measure the degree of reduction in grayscale inversion and gamma-curve distortion, a CS-1000 was used as a measuring device. FIG. 38 was obtained by measuring luminances with respect to gray levels of W, R, G and B at vertical viewing angles of 0°, 30° and 60°. FIG. 39 was obtained by directly attaching an optical film sample to the display panel and then measuring in the same manner. As can be seen, when the optical film was used, grayscale inversion was reduced as a result of the recovery of gamma-curve linearity, the difference between gamma-curves was significantly decreased, and gamma-curve distortion was decreased.

FIG. 40 to FIG. 43 are graphs showing that the optical film for reducing color shift according to a comparative example reduces color shift and gamma-curve distortion in a 46" LCD TV (model number: LH46CSPLBC) that employs an S-PVA panel.

Figure 40:
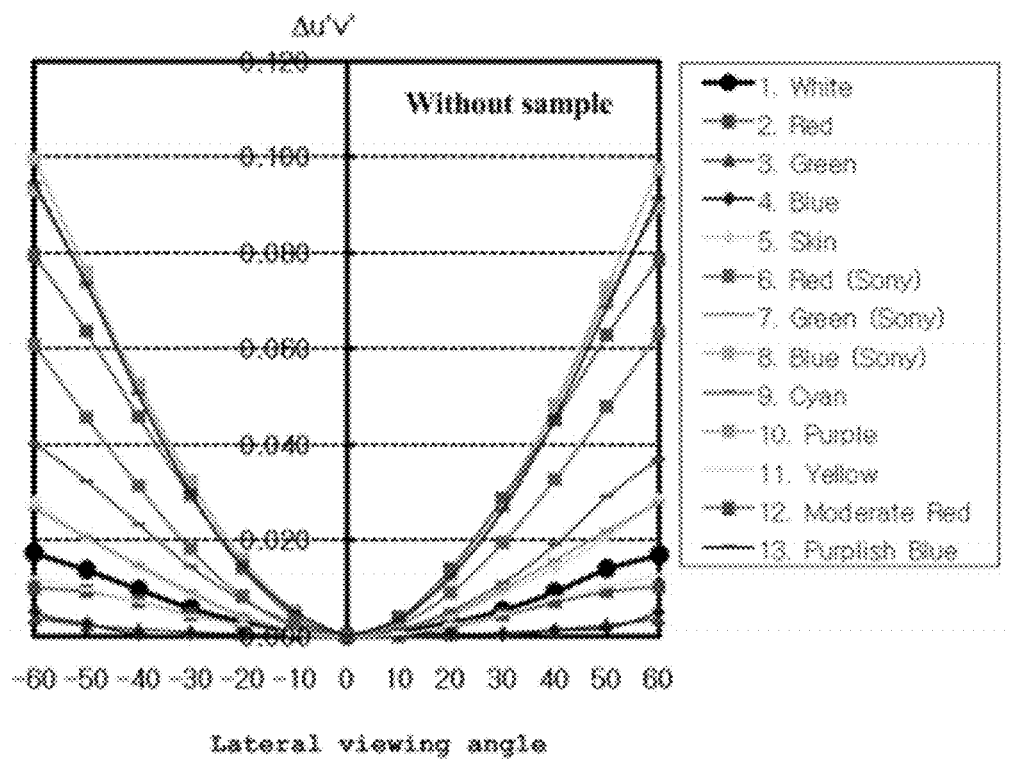
FIG. 40 to FIG. 43 are graphs showing that an optical film for reducing color shift according to a comparative example reduces color shift and gamma-curve distortion in a 46" LCD TV (model number: LH46CSPLBC) that employs an S-PVA panel.
Figure 41:
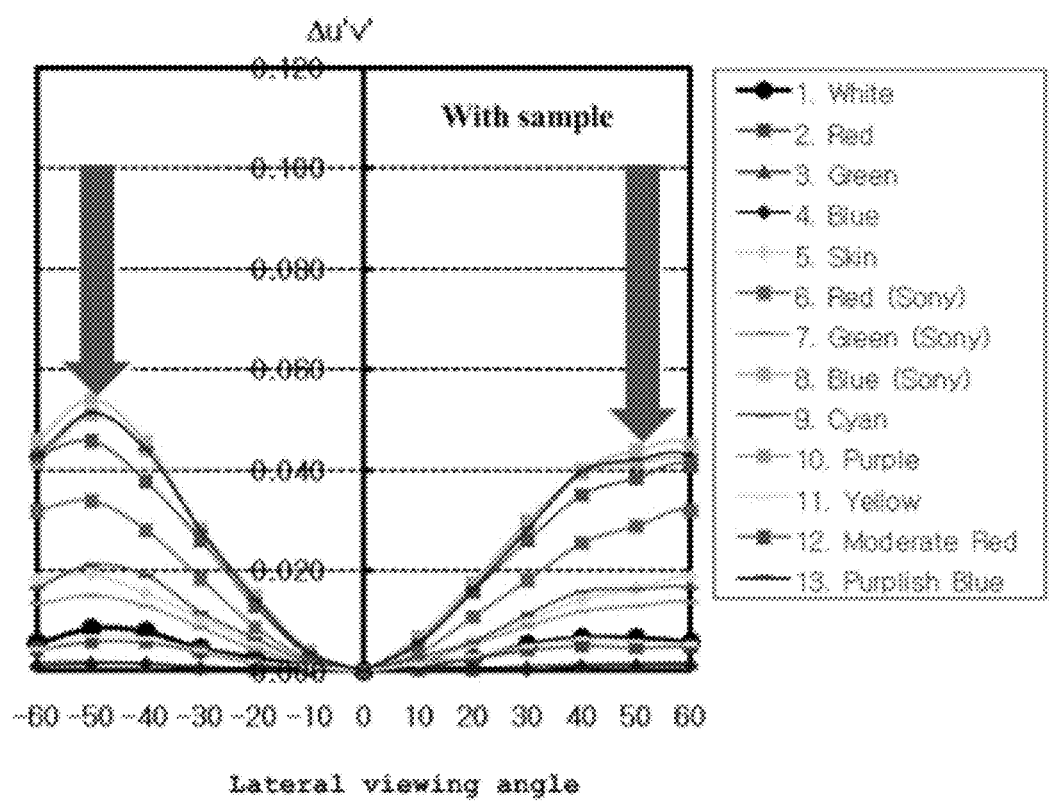

In order to measure the degree of color shift reduction, an SS320 goniometer was used as a measuring device. FIG. 40 was obtained by measuring color coordinates at horizontal watching angles ranging from 0 to 60° at an interval of 10° and then converting the color coordinates into color shift. FIG. 41 was obtained by directly attaching an optical film sample to the display panel and then measuring and converting in the same manner. As can be seen, the ratios of color shift reduction were 48.7% (left) and 53.7% (right).

Figure 42:
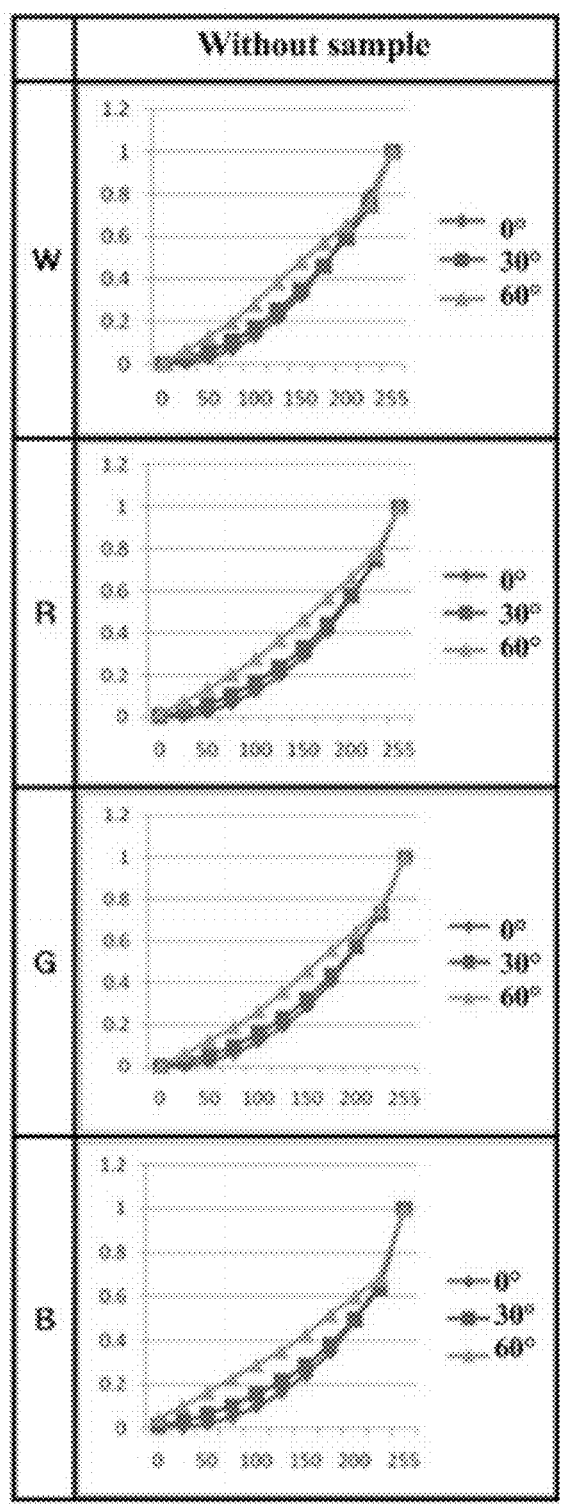
Figure 43:
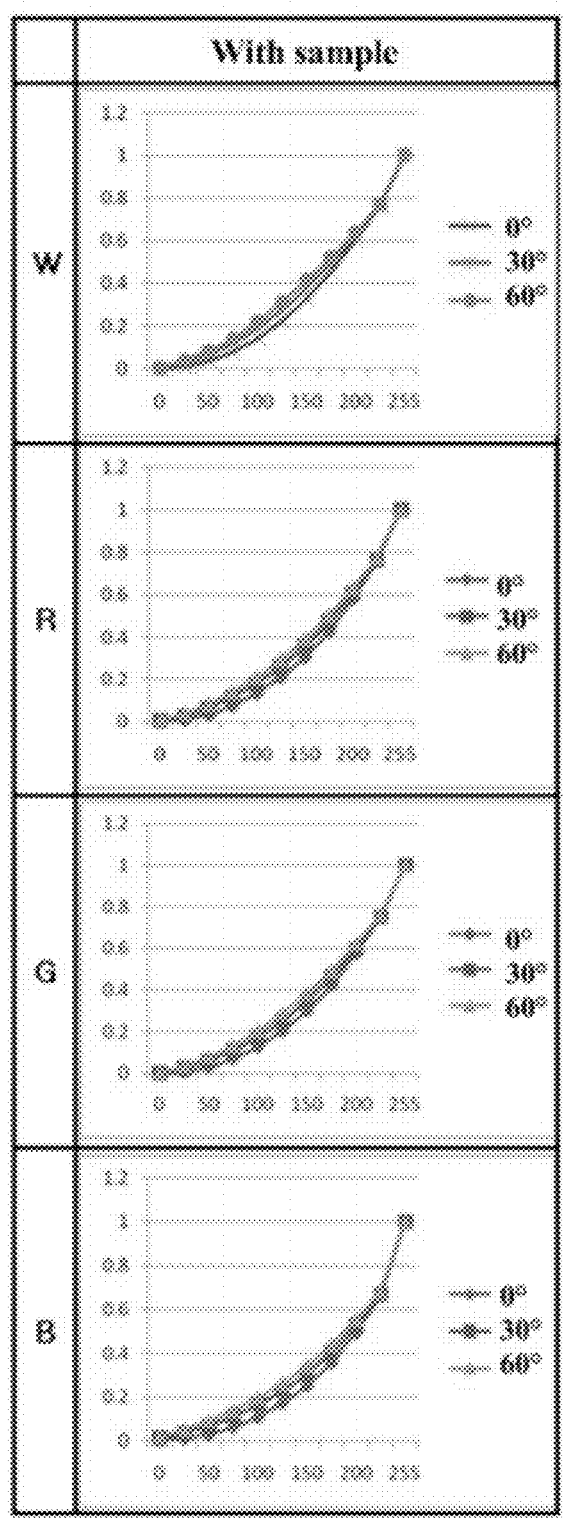
Figure 44:
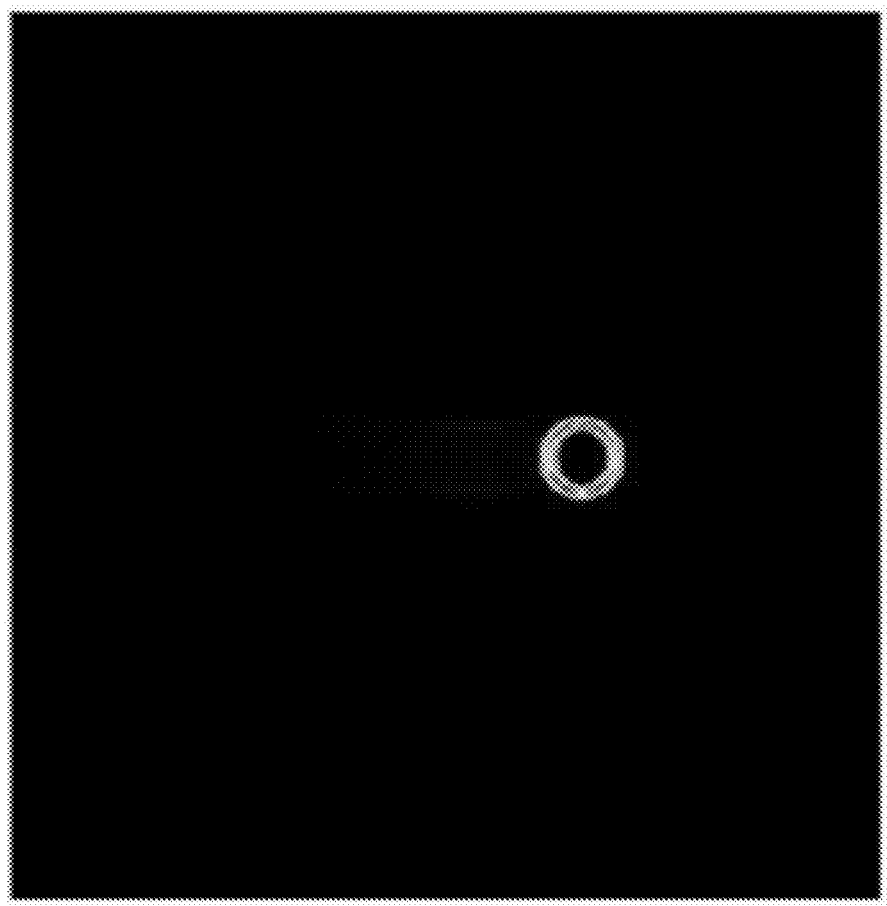
FIG. 44 to FIG. 49 are views showing the relationship between the depth-to-width ratio of lens sections and ghosts.
Figure 45:
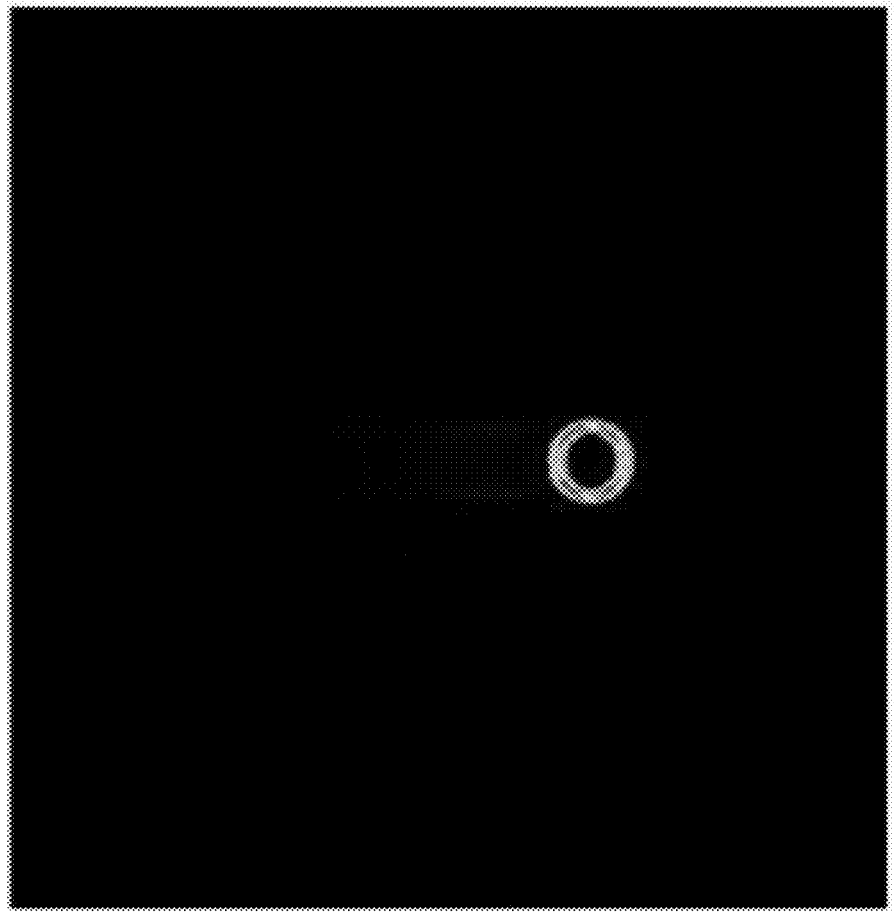
Figure 46:
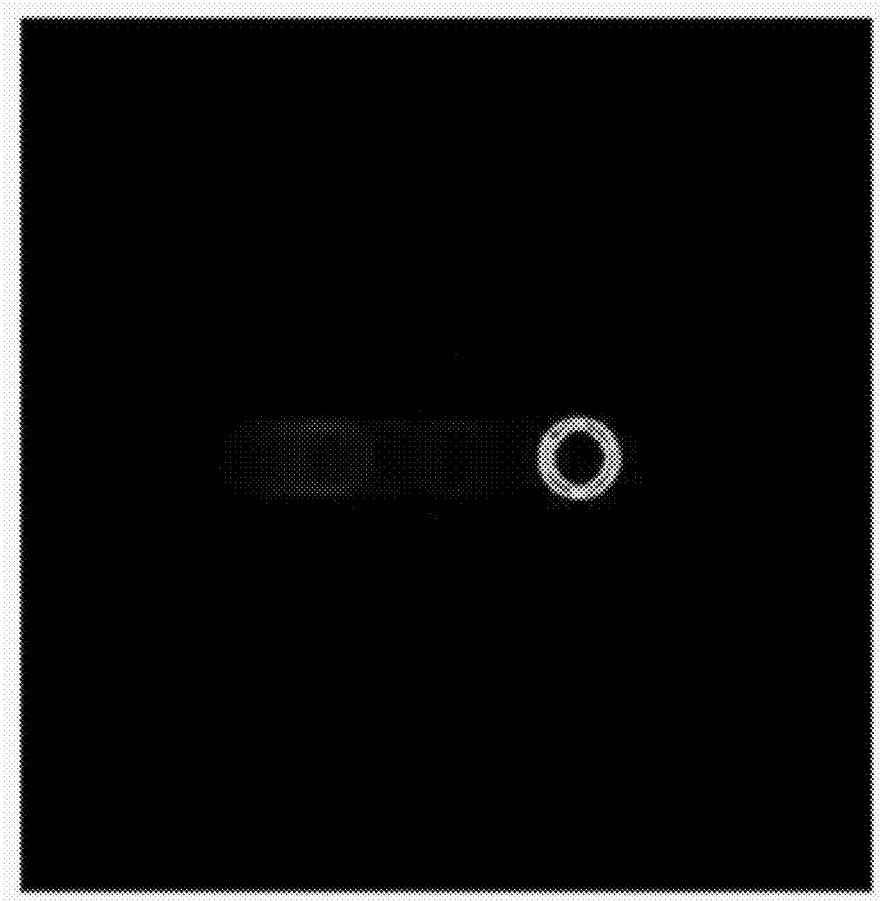
Figure 47:
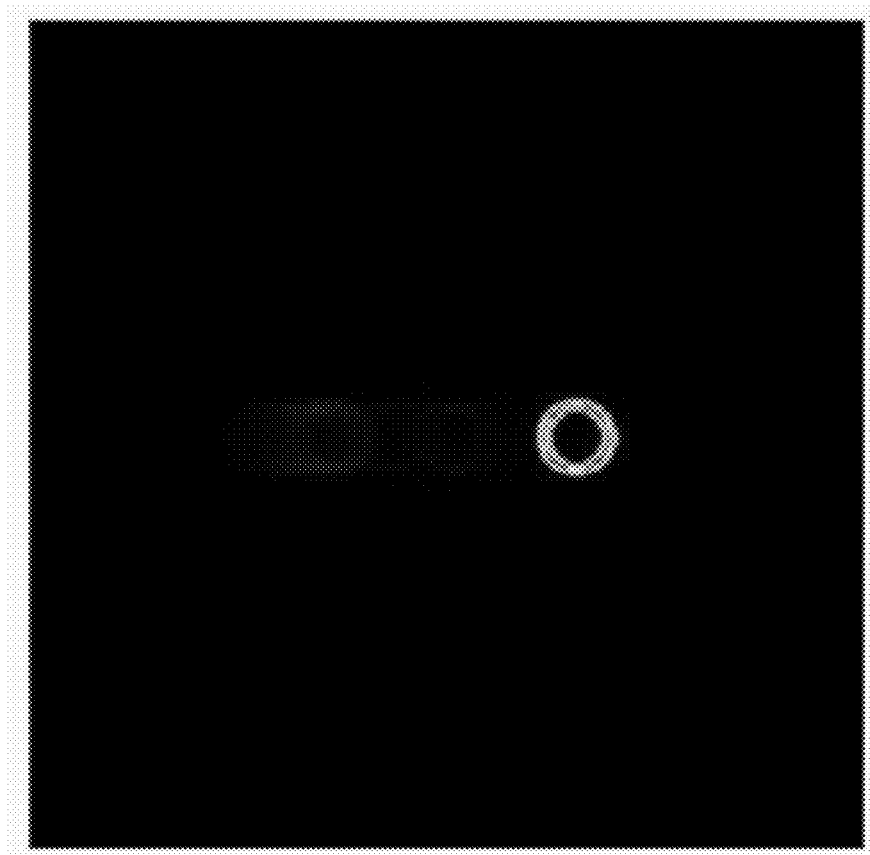

In order to measure the degree of reduction in gamma-curve distortion, a CS-1000 was used as a measuring device. FIG. 42 was obtained by measuring luminances with respect to gray levels of W, R, G and B at left horizontal watching angles of 0°, 30° and 60°. FIG. 43 was obtained by directly attaching an optical film sample to the display panel and then measuring in the same manner. As can be seen, when the optical film was used, the difference between gamma-curves was significantly decreased.

Embodiments of the Invention

Color shift was greatly reduced by disposing the optical film of the above-described comparative examples in front of the display panel. Furthermore, the problems of ghosts and hazing can be overcome by disposing the optical film such that it is in close contact with the front portion of the display panel.

The features for reducing color shift and grayscale inversion and the features for preventing ghosts and hazing in the above-described comparative examples are also the essential features in the invention. The invention, however, proposes an additional solution to further increase the improvement in color change of the optical film for reducing color shift.

In the optical film of comparative examples, when the width of the lens sections is increased with pitches being set to a constant value, more of the light emitted from the display panel is incident onto the curved surfaces of the lens sections. Consequently, more light diffuses, thereby increasing the effect of color shift reduction. However, this is also accompanied with the drawback of transmissivity reduction because of the pitch between the light-transmitting sections, i.e. the lens sections, being decreased. That is, there is a trade-off relationship between color shift reduction and transmissivity.

In the meantime, if the depth-to-width ratio of the lens sections is increased, the improvement in color change and transmissivity are both increased, as presented in Table 2 below.

TABLE 2

| Depth (μm) | Width (μm) | Pitch (μm) | Width/pitch | Depth/width | Improvement in color change | Transmissivity (%) |
|---|---|---|---|---|---|---|
| 40 | 20 | 90 | 0.22 | 2 | 38% | 78.9% |
| 50 | 20 | 90 | 0.22 | 2.5 | 53% | 79.0% |
| 62.5 | 20 | 90 | 0.22 | 3.125 | 54% | 84.7% |
| 80 | 20 | 90 | 0.22 | 4 | 66% | 86.2% |

However, increasing the depth-to-width ratio of the lens sections causes the problem of increased ghosts.

FIG. 44 to FIG. 49 are views showing the relationship between the depth-to-width ratio of the lens sections and ghosts.

The occurrence of ghosts was measured by preparing lens sections as presented in Table 3 below.

TABLE 3

| | Depth (μm) | Width (μm) | Pitch (μm) | Width/pitch | Depth/width |
|---|---|---|---|---|---|
| Model_0.009 | 9 | 9 | 60 | 0.15 | 1 |
| Model_0.018 | 18 | 18 | 120 | 0.15 | 1 |
| Model_0.045 | 45 | 9 | 60 | 0.15 | 5 |
| Model_0.090 | 90 | 18 | 120 | 0.15 | 5 |

Figure 48:
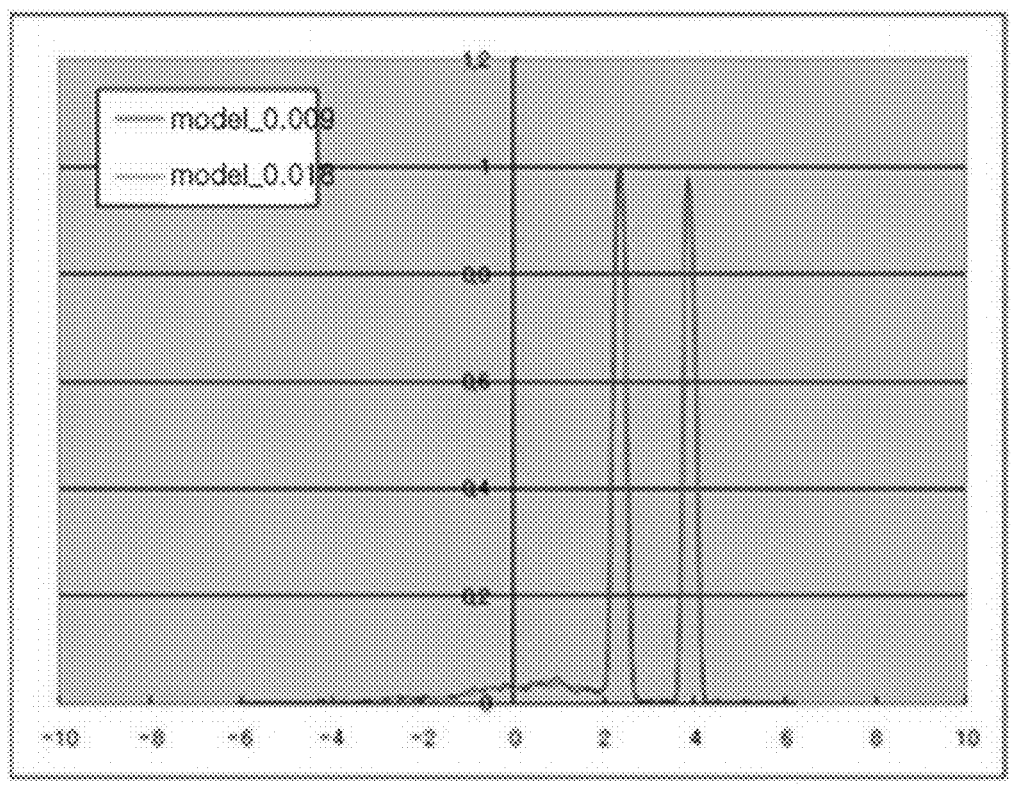
Figure 49:
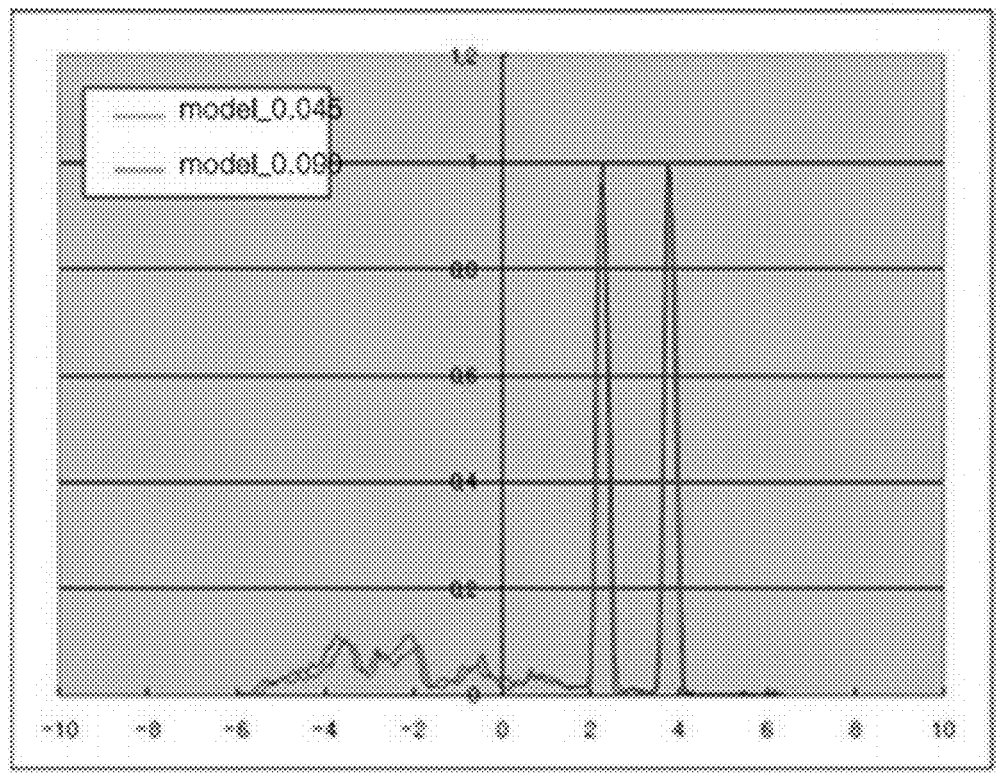

FIG. 44, FIG. 45, FIG. 46 and FIG. 47 are views showing an original image and a ghost in Model_0.009, Model_0.018, Model_0.045 and Model_0.090, respectively. FIG. 48 is a view showing luminance distribution in Model_0.009 and Model_0.018. FIG. 49 is a view showing luminance distribution in Model_0.045 and Model_0.090. When measured, as shown in FIG. 44 to FIG. 49, it was found that ghosts increased when the depth-to-width ratio of the lens sections was increased.

Therefore, a solution that can decrease ghosts while increasing the improvement in color change and transmissivity is required.

Figure 50:
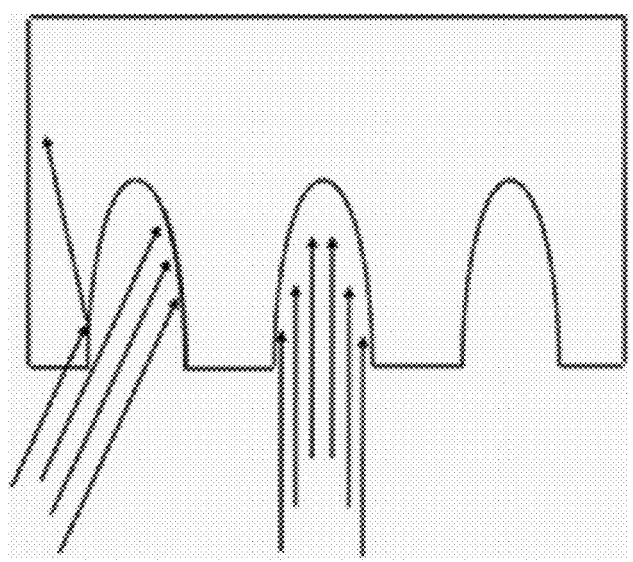
FIG. 50 is a view showing the reason why improvement in color change of an optical film for reducing color shift according to a comparative example is relatively insignificant.
Figure 51:
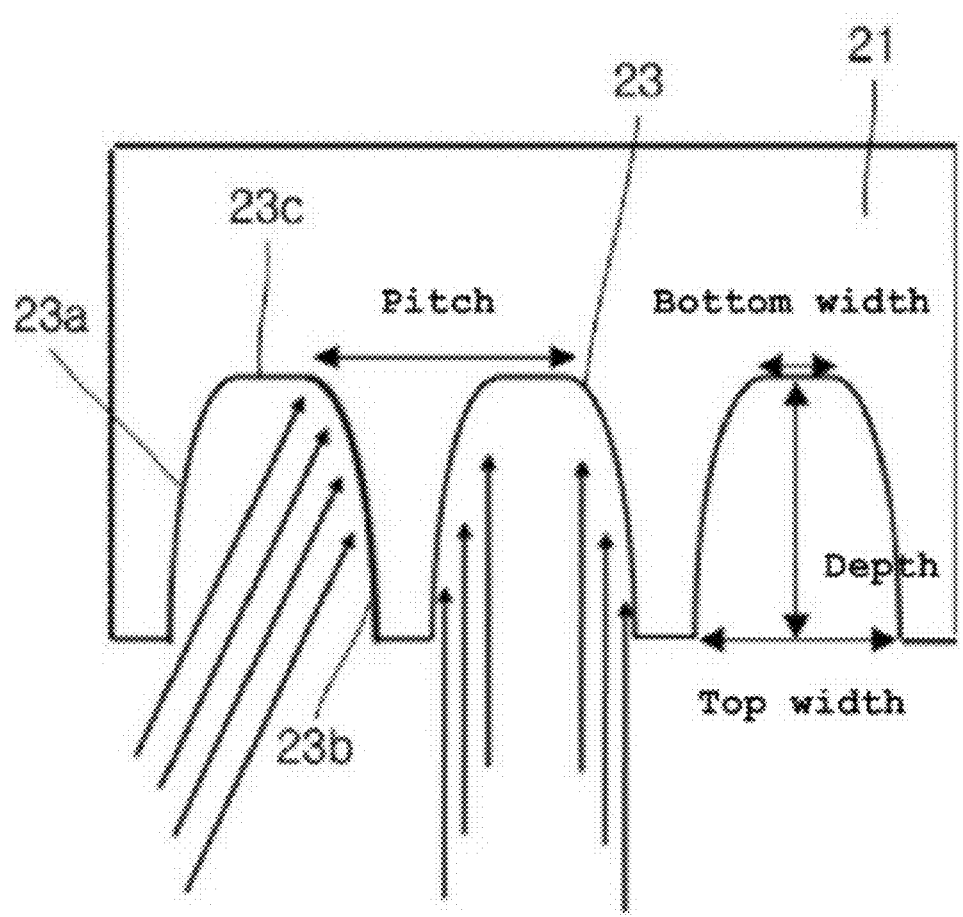
FIG. 51 is a view schematically showing an optical film for reducing color shift according to an exemplary embodiment of the invention, which increases improvement in color change.

FIG. 50 is a view showing the reason why the improvement in color change of an optical film for reducing color shift according to a comparative example is relatively insignificant, and FIG. 51 is a view schematically showing an optical film for reducing color shift according to an exemplary embodiment of the invention, which increases the improvement in color change.

As described above, it may be preferred that the depth-to-width ratio of the lens sections be increased within the range in which the problem of ghosts does not occur, since increasing the depth-to-width ratio of the lens sections also increases the improvement in color change and transmissivity.

From this point of view, it is difficult for a person to perceive ghosts in the range in which the depth-to-width ratio of the lens sections is 2 or less. In this range, the intensity of a ghost decreases, and the distance from the original image also decreases. However, as presented in Table 2 above, the maximum improvement in color change that can be obtained from the optical film for reducing color shift according to a comparative example in this range was 38%. Therefore, a solution to increase the relatively low improvement in color change is required.

The reason why the improvement in color change of the optical film for reducing color shift according to a comparative example is relatively insignificant can also be found in FIG. 50. When light is incident, at an incline, onto an optical film for reducing color shift according to a comparative example, in which the cross-section of lens sections has a semi-elliptical profile, the incident area on the curved surface of the lens sections is small, and thus the improvement in color change is insignificant.

Accordingly, as shown in FIG. 51, the semi-elliptical cross-section is divided such that the amount of light (blue color in FIG. 51) that is incident at an incline onto the curved surface of the lens sections is increased, thereby increasing the effect of reducing color shift. Here, since the area of flat surfaces of the optical film (i.e. the intervals between the lens sections+the bottom widths) is the same, transmissivity is not decreased.

In the lens sections according to an exemplary embodiment of the invention, the profile of the cross-section includes a first side 23a, a second side 23b and a third side 23c. The first and second sides 23a and 23b face each other, and the third side 23c connects the first and second sides 23a and 23b to each other. The average curvature of the third side 23c is smaller than that of the first side 23a and that of the second side 23b. Therefore, the first and second sides 23a and 23b are curves, and the third side 23c is linear or substantially linear. Here, the term "average" indicates that the partial curvatures of the first and second sides 23a and 23b may be smaller, or the partial curvature of the third side 23c may be greater within the scope of the invention. Although the first and second sides 23a and 23b are illustrated as being arcs of an ellipse and the third side 23c is illustrated as being linear in this embodiment, they are not limited thereto. In an example, the first and second sides 23a and 23b may include a curve other than an arc of an ellipse, and may even include a straight line. The third side 23c may be a combination of a straight line and a curve.

The average tangential inclination of the third side 23c is close to 0 in relation to the average tangential inclination of the first side 23a and the average tangential inclination of the second side 23b. It is preferred that the average tangential inclination of the third side range from −0.5 to 0.5. Therefore, the third side 23c is substantially parallel to the rear surface of the background layer. Here, the term "average" indicates that the absolute value of the partial tangential inclination of the first or second sides 23a or 23b is smaller, or the absolute value of the partial tangential inclination of the third side 23c is greater within the scope of the invention.

It is preferred that the profile of the cross-section of the lens sections be symmetrical about the center line of the third side 23c.

Here, a plurality of the engraved lens sections is formed such that they are spaced apart from each other. This means that the engraved lens sections, which refract light that passes through the cross-section of the background layer, are spaced apart from each other, and that a flat surface of the background layer is present between adjacent engraved lens sections. Accordingly, the lens sections having a predetermined pattern, e.g., a matrix having a semi-elliptical cross-section, look like a single lens structure having a matrix pattern when they are viewed from the front of the background layer, whereas the lens sections look to be spaced apart from each other when they are viewed on the cross-section of the background layer.

Figure 52:
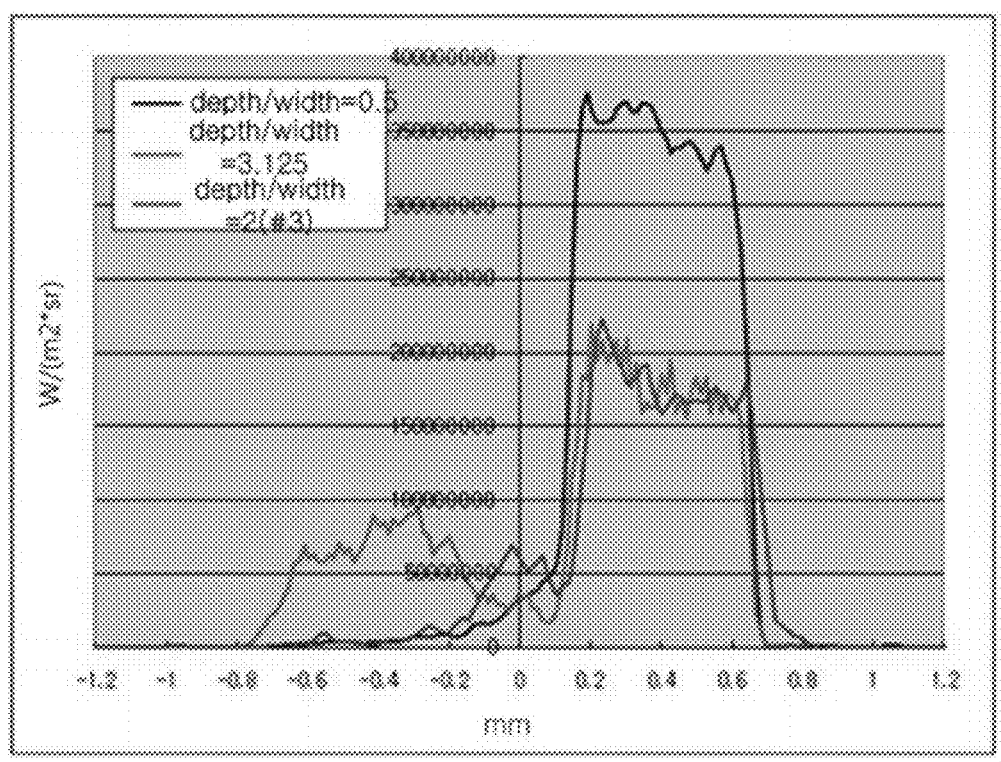
FIG. 52 is a view showing that an optical film for reducing color shift according to an exemplary embodiment of the invention is not accompanied with the problem of ghosts.

FIG. 52 is a view showing that the optical film for reducing color shift according to an exemplary embodiment of the invention is not accompanied with the problem of ghosts.

As the size (bottom width) of the third side 23c increases, the improvement in color change is increased but transmissivity remains the same, as presented in Table 4 below. When the bottom width is greater than 0, the improvement in color change begins to increase. The limit is when the bottom width is ⅓ of a pitch. Therefore, this satisfies the relationship 0<bottom width/pitch≤⅓, which is preferable. In addition, referring to FIG. 15 and FIG. 16, this also satisfies the relationship 0.5<top width−bottom width≤0.95, which is preferable.

TABLE 4

| | Depth (μm) | Width (μm) (top − bottom widths) | Top width (μm) | Bottom width (μm) | Pitch (μm) | Depth/width | Improvement in color change (%) | Transmissivity (%) |
|---|---|---|---|---|---|---|---|---|
| Ref. | 40 | 20 | 20 | — | 90 | 2 | 38.2 | 78.9 |
| #1 | 40 | 20 | 25 | 5 | 90 | 2 | 46.0 | 76.7 |
| #2 | 40 | 20 | 30 | 10 | 90 | 2 | 46.7 | 77.1 |
| #3 | 40 | 20 | 35 | 15 | 90 | 2 | 51.4 | 77.2 |
| #4 | 40 | 20 | 50 | 30 | 90 | 2 | 52.4 | 77.2 |

Ghosts of #3 in Table 4 were measured and depicted in FIG. 52. Depth/width 0.5 and depth/width 3.125 relate to samples without a bottom width. Depth/width 3.125 shows a ghost (left peak) and an original image (right peak), whereas depth/width 0.5 shows only an original image. In depth/width 2, without a bottom width, an insignificant ghost peak is present but it substantially overlaps the original image. Therefore, is difficult to identify the ghost, which is in the tolerable range, meaning that it cannot be perceived by a person. Accordingly, it can be appreciated that the problem of ghosts is not caused.

The optical filter for a display device of the present invention may be configured as a single film of the background layer in which the above-described lens sections are formed, or as a multi-layer optical filter by layering a variety of functional films, such as a transparent substrate for protecting the panel, an anti-fog film, an anti-reflection film, a polarizer film and a phase retardation film, on the background layer.

In this case, respective constitutional layers of the optical filter of the present invention may be adhered or bonded using an adhesive or a bonding agent. Specific examples thereof may include, but are not limited to, acrylic adhesives, silicone-based adhesives, urethane-based adhesives, polyvinyl butyral (PMB) adhesives, ethylene vinyl acetate (EVA)-based adhesives, polyvinyl ether (PVE), saturated amorphous polyester and melamine resins.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An optical film for reducing color shift in a display, the optical film being disposed in front of a display panel of the display, and comprising:
    a background layer; and
    a plurality of engraved or embossed lens sections formed on the background layer such that the lens sections are spaced apart from each other,
    wherein, when light is emitted from the display, the lens sections diffuse a direction in which a portion of the light incident onto the lens sections is emitted, so that the portion of the light is mixed with another portion of the light passing between adjacent ones of the lens sections,
    wherein a respective cross-sectional profile of the lens sections includes first, second and third sides, the first and second sides facing each other, the third side connecting the first and second sides to each other, and an average curvature of the third side being smaller than that of the first side and than that of the second side;
    wherein a relationship, 0.5≤1−(a width of the lens section−a width of the third side)/(a pitch of the lens section)≤0.95 is satisfied.

2. The optical film of claim 1, wherein an average tangential inclination of the third side is closer to 0 than those of the first and second sides.

3. The optical film of claim 2, wherein the average tangential inclination of the third side ranges from −0.5 to 0.5.

4. The optical film of claim 1, wherein each of the first and second sides includes a curve.

5. The optical film of claim 4, wherein each of the first and second sides includes an arc of an ellipse.

6. The optical film of claim 1, wherein the third side includes a straight line.

7. The optical film of claim 1, wherein a depth-to-width ratio of the lens sections is 2 or less.

8. The optical film of claim 1, wherein a relationship, 0<(a width of the third side/a pitch of the lens sections)≤⅓ is satisfied.

9. The optical film of claim 1, wherein the profile of the respective cross-section of the lens sections is symmetrical about a center line of the third side.

10. The optical film of claim 1, wherein the background layer is self-adhesive.

11. A display comprising the optical film of claim 1.

12. The display of claim 11, wherein the lens sections of the optical film are formed in a rear surface of the background layer that faces the display panel.

13. The display of claim 11, wherein the optical film is in close contact with the display panel.

14. The display of claim 13, wherein the optical film is adhered to the display panel by means of an adhesive.

15. The display of claim 13, wherein the background layer is self-adhesive and is directly attached to the display panel.

* * * * *